(12) United States Patent
He et al.

(10) Patent No.: US 10,365,830 B2
(45) Date of Patent: Jul. 30, 2019

(54) METHOD, DEVICE, AND SYSTEM FOR IMPLEMENTING HARDWARE ACCELERATION PROCESSING

(71) Applicant: Huawei Technologies Co., Ltd., Shenzhen (CN)

(72) Inventors: Jian He, Shenzhen (CN); Xiaoke Ni, Shenzhen (CN); Yu Liu, Shenzhen (CN); Jinshui Liu, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 15/786,207

(22) Filed: Oct. 17, 2017

(65) Prior Publication Data
US 2018/0059939 A1    Mar. 1, 2018

Related U.S. Application Data

(63) Continuation of application No. PCT/CN2016/096955, filed on Aug. 26, 2016.

(51) Int. Cl.
  *G06F 3/06*      (2006.01)
  *G06F 12/02*     (2006.01)
  *G06F 15/173*    (2006.01)
  *G06F 12/1081*   (2016.01)

(52) U.S. Cl.
  CPC ............ *G06F 3/061* (2013.01); *G06F 3/0659* (2013.01); *G06F 12/0284* (2013.01);
  (Continued)

(58) Field of Classification Search
  CPC .. G06F 12/00; G06F 12/0284; G06F 12/1081; G06F 15/17331;
  (Continued)

(56) References Cited

U.S. PATENT DOCUMENTS 10,013,734 B1*  7/2018  Boles .................. G06T 1/60
2013/0318277 A1* 11/2013 Dalal .................. G06F 13/1652
                                                   710/308
(Continued)

FOREIGN PATENT DOCUMENTS

CN         103200128 A      7/2013

OTHER PUBLICATIONS

Machine Translation and Abstract of Chinese Publication No. CN103200128, Jul. 10, 2013, 30 pages.

(Continued)

*Primary Examiner* — Zhuo H Li
(74) *Attorney, Agent, or Firm* — Conley Rose, P.C.

(57) ABSTRACT

A method, device, and system for implementing hardware acceleration processing, where the method includes memory mapping input/output (MMIO) processing being performed on a data buffer address of a hardware acceleration processor in order to obtain an address in addressing space of a central processing unit (CPU). In addition, a network adapter has a remote direct memory access (RDMA) or a direct memory access (DMA) function. Alternatively, a network adapter of a hardware acceleration device can directly send received data on which the hardware acceleration processing is to be performed to a hardware acceleration processor. In this way, resource consumption is reduced when the CPU of a computer device receives and forwards the data on which the hardware acceleration processing is to be performed, and in addition, storage space of a memory of the computer device is saved.

20 Claims, 7 Drawing Sheets

(52) U.S. Cl.
CPC .... *G06F 12/1081* (2013.01); *G06F 15/17331* (2013.01); *G06F 2212/1016* (2013.01); *G06F 2212/1041* (2013.01); *G06F 2212/154* (2013.01); *G06F 2212/206* (2013.01)

(58) Field of Classification Search
CPC ..... G06F 2212/1016; G06F 2212/1041; G06F 2212/154; G06F 2212/206; G06F 3/061; G06F 3/065; G06F 3/0659
See application file for complete search history.

(56) References Cited

U.S. PATENT DOCUMENTS

| | | | |
|---|---|---|---|
| 2015/0134871 A1 | 5/2015 | Benisty et al. | |
| 2015/0288624 A1* | 10/2015 | Raindel | H04L 49/90 709/219 |
| 2016/0085684 A1* | 3/2016 | Borikar | G06F 12/109 711/209 |
| 2018/0314433 A1* | 11/2018 | Guo | H04L 29/06 |

OTHER PUBLICATIONS

Foreign Communication From a Counterpart Application, PCT Application No. PCT/CN2016/096955, English Translation of International Search Report dated Jun. 1, 2017, 4 pages.

Foreign Communication From a Counterpart Application, European Application No. 16890896.0, Extended European Search Report dated Oct. 22, 2018, 14 pages.

* cited by examiner

METHOD, DEVICE, AND SYSTEM FOR IMPLEMENTING HARDWARE ACCELERATION PROCESSING

CROSS-REFERENCE TO RELATED APPLICATION

This application is a continuation of International Patent Application No. PCT/CN2016/096955 filed on Aug. 26, 2016, which is hereby incorporated by reference in its entirety.

TECHNICAL FIELD

The present disclosure relates to the field of information technologies, and in particular, to a method, device, and system for hardware acceleration processing.

BACKGROUND

In a current computing cluster, an increasing quantity of applications of a hardware acceleration module has an increasingly higher requirement on performance of the hardware acceleration module. When a signal hardware acceleration module does not meet the requirement, more hardware acceleration modules may need to be installed. However, in a large cluster, hardware acceleration modules of different nodes have different load.

In an existing computer system, as processing amounts of various services increase, using only a central processing unit (CPU) to process services is increasingly unable to meet an application performance requirement. The CPU usually improves system processing performance by optimizing a software architecture, and this is difficult and limited in an improvement range. Currently, hardware performance improvement is a common system performance improvement manner in the industry. Some practical hardware accelerator engines are usually built in a data center server according to a service situation to assist a processor core to work, and running these engines does not consume a CPU resource. These hardware accelerator engines include but are not limited to an intelligent packet distribution engine, hardware encryption engine, hardware compression/decompression engine, graphics acceleration processing engine, and the like.

To avoid wasting hardware acceleration resources, the hardware acceleration resources or the hardware accelerator engines are usually distributed on different service nodes (for example, computer devices such as servers). However, when the hardware acceleration resources are shared or mutually called between multiple nodes, CPU and memory resources on the nodes usually need to be consumed for copying data, consequently causing occupation and consumption of the CPU and memory resources.

SUMMARY

Embodiments of the present disclosure provide a method, device, and system for implementing hardware acceleration processing in order to reduce occupation and consumption of CPU and memory resources when different computer devices share a hardware acceleration resource.

According to a first aspect of the embodiments of the present disclosure, a computer device is provided. The computer device includes computer components such as a CPU, a hardware acceleration unit, and a network adapter. The computer device may further include another computer component such as a memory, a hard disk, or a power supply. The network adapter has a remote direct memory access (RDMA) or direct memory access (DMA) function, and receives data on which hardware acceleration processing is to be performed and a data mapping address that are sent by another computer device, and sends, according to the data mapping address, the data on which hardware acceleration processing is to be performed to data storage space of the hardware acceleration unit. The data mapping address is an address that is in addressing space of the CPU and that is obtained by performing memory mapping input/output (MMIO) processing on a data buffer address of the hardware acceleration unit. The data storage space of the hardware acceleration unit is data storage space corresponding to the data buffer address of the hardware acceleration unit. The hardware acceleration unit performs hardware acceleration processing on the data on which hardware acceleration processing is to be performed in the data storage space to obtain data that is after the hardware acceleration processing.

In the foregoing computer device, a data mapping address is an address that is in addressing space of a CPU and that is obtained by performing MMIO processing on a data buffer address of a hardware acceleration unit, and a network adapter has an RDMA or DMA function. Therefore, based on the RDMA or DMA function, the network adapter can send, according to the data mapping address, the data on which hardware acceleration processing is to be performed to data storage space of the hardware acceleration unit when sending received data on which hardware acceleration processing is to be performed to the addressing space of the CPU. In this way, the network adapter does not need to send the received data on which hardware acceleration processing is to be performed to a memory corresponding to the addressing space of the CPU, and then the CPU does not need to send the data on which hardware acceleration processing is to be performed from the memory to data storage space corresponding to the data buffer address of the hardware acceleration unit. Resource consumption is reduced when the CPU of the computer device receives and forwards the data on which hardware acceleration processing is to be performed, and in addition, storage space of the memory of the computer device is saved.

The hardware acceleration unit may be a standalone hardware device independent of the CPU, or may be a hardware acceleration function module integrated in the CPU or the network adapter.

The network adapter may receive the data on which hardware acceleration processing is to be performed and the data mapping address at the same time, or first receive the data mapping address and then the data on which hardware acceleration processing is to be performed, or first receive the data on which hardware acceleration processing is to be performed and then the data mapping address.

Optionally, the data buffer address of the hardware acceleration unit is a buffer address of a base address register (BAR) of the hardware acceleration unit.

Optionally, the hardware acceleration unit performs the MMIO processing on the data buffer address of the hardware acceleration unit to map the data buffer address to the addressing space of the CPU. Further, a driver of the hardware acceleration unit may map the data buffer address of the hardware acceleration unit to the addressing space of the CPU by means of the MMIO processing.

Optionally, a basic input/output system (BIOS) of the computer device obtains a base address and a BAR address space length of the BAR register of the hardware acceleration unit at a startup stage, reserves an address in the addressing space of the CPU according to the base address and the BAR address space length, and reserves an address space with a length equal to the BAR address space length. After the computer device enters the startup stage of an operating system (OS), the driver of the hardware acceleration unit reads a base address and a BAR address space length of configuration space of the hardware acceleration unit, and then calls an MMIO mapping function provided by the OS to map the base address and a corresponding BAR address space to the addressing space of the CPU. In this way, by accessing an address in the addressing space, the CPU can access a buffer address of the hardware acceleration unit, that is, access a buffer address in the BAR address space of the hardware acceleration unit. Because the CPU accesses the hardware acceleration unit by accessing the addressing space, the CPU may use an instruction same as that for reading and writing the memory to access the data buffer address of the hardware acceleration unit. This can reduce program design difficulty and interface complexity.

Optionally, the hardware acceleration unit may be presented as a peripheral component interconnect express (PCIe) device, that is, a hardware acceleration unit that follows a PCIe protocol standard. The hardware acceleration unit usually has an address that can be directly accessed by the CPU when the hardware acceleration unit is not a PCIe device (such as an accelerator built in the CPU). For example, a hardware acceleration device directly connected to the CPU using a double data rate (DDR) interface has an address space that can be accessed by the CPU. This can implement a technical effect same as that obtained after the PCIe device performs MMIO mapping.

Optionally, if the hardware acceleration unit does not support the MMIO mapping, the driver and hardware logic of the hardware acceleration unit need to be modified, to map the data buffer address of the hardware acceleration unit in an MMIO manner.

Optionally, some data buffer addresses may be selected and mapped to the addressing space of the CPU, and some may be not mapped when the data buffer address of the hardware acceleration unit is mapped to the addressing space of the CPU in the MMIO manner. The data buffer address on which the MMIO processing is performed and that is mapped to the addressing space of the CPU can be used by a CPU of another computer device to apply for a corresponding hardware acceleration resource, that is, a shared hardware acceleration resource. For a data buffer address on which no MMIO mapping is performed, hardware acceleration processing is left to be performed by an application program of the computer device using the CPU of the computer device, that is, a private hardware acceleration resource.

Optionally, division of the shared hardware resource and the private hardware resource may be adjusted dynamically to meet different actual requirements and improve flexibility of use of hardware acceleration resources.

Optionally, a resource of the hardware acceleration unit may be divided into multiple queues, and different queues separately process different data. This division manner may be performed in a software manner, or may be performed in a hardware logic manner. In the software division manner, management software running in the hardware acceleration unit provides a unified scheduling interface, and for all requesting parties requiring access to the hardware acceleration unit, the CPU of the computer device needs to call the scheduling interface of the management software to obtain a corresponding resource description, and control a corresponding queue according to the corresponding resource description. Hardware division is to divide a resource of the hardware acceleration unit with respect to hardware logic. For example, the hardware acceleration unit is divided into multiple hardware logical units, and each hardware logical unit is independent. When requiring access to a hardware acceleration resource, a hardware acceleration requesting party needs only to apply for one or more hardware logical units. This can avoid an allocation collision of a hardware acceleration device resource.

The computer device may send the data mapping address of the hardware acceleration unit to a management node, and the management node is a device connected to the computer device. The other computer device can obtain the data mapping address of the hardware acceleration unit in the computer device from the management node.

Optionally, after completing the hardware acceleration processing on the data on which hardware acceleration processing is to be performed, the hardware acceleration unit determines whether to send the data obtained after the hardware acceleration processing to the other computer device, and directly sends the data obtained after the hardware acceleration processing to the network adapter when determining to send the data obtained after the hardware acceleration processing to the other computer device. Correspondingly, the network adapter sends the data obtained after the hardware acceleration processing to the other computer device.

A manner of the determining may be implemented according to a destination address (the destination address is located in the other computer device) or a preset identifier (an identifier identifying that the data obtained after the acceleration processing comes from the other computer device) of the data obtained after the acceleration processing.

When sending the data obtained after the hardware acceleration processing to the other computer device, the network adapter may send the received data obtained after the hardware acceleration unit performs the acceleration processing to the other computer device in an RDMA manner.

Optionally, the network adapter can send the data obtained after the hardware acceleration processing to the other computer device by means of a SEND/WRITE operation in an RDMA protocol.

Optionally, the network adapter can send the data obtained after the hardware acceleration processing according to a next-hop destination address of the data obtained after the hardware acceleration processing. By specifying a next-hop destination, the data obtained after the hardware acceleration processing may be directly returned to a requesting computer device, or may be sent to another computer device, thereby implementing flexible data processing.

When requiring the hardware acceleration unit to perform the hardware acceleration processing, the other computer device needs to obtain a permission for controlling the hardware acceleration unit. To further avoid resource consumption of the CPU, optionally, the hardware acceleration unit performs MMIO processing on a control register address of the hardware acceleration unit to map the control register address to the addressing space of the CPU. In this way, the other computer device may directly send, to the hardware acceleration unit using the network adapter, the obtained control register address of the hardware acceleration unit on which the MMIO processing is performed.

The control register address of the hardware acceleration unit may be a control register address in the BAR of the hardware acceleration unit.

Optionally, the BAR address space of the hardware acceleration unit may further include a lock address. The lock address is also mapped to the addressing space of the CPU of the computer device when the BAR address space of the hardware acceleration unit is mapped to the addressing space of the CPU of the computer device.

According to a second aspect of the embodiments of the present disclosure, a hardware acceleration device is provided, and the hardware acceleration device includes a hardware acceleration processing unit and a network adapter. Certainly, the hardware acceleration device may further include other necessary hardware that supports running of the hardware acceleration processing unit and the network adapter, such as a power supply. The network adapter has an RDMA or a DMA function, and sends the data on which hardware acceleration processing is to be performed to data storage space corresponding to a data buffer address of the hardware acceleration processing unit when receiving data on which hardware acceleration processing is to be performed, where the data storage space corresponding to the data buffer address is storage space used by the hardware acceleration processing unit to store the data on which hardware acceleration processing needs to be performed. The hardware acceleration processing unit performs the hardware acceleration processing on the data on which hardware acceleration processing is to be performed in the data storage space, and returns data obtained after the hardware acceleration processing to the network adapter.

The foregoing hardware acceleration device includes a hardware acceleration processing unit and a network adapter, that is, the network adapter can directly send data on which hardware acceleration processing is to be performed to the hardware acceleration processing unit for processing. Participation of a CPU and a memory is eliminated to implement hardware acceleration resource sharing, thereby further saving hardware resources. In addition, no other device besides the CPU and the memory is required to run in a server to implement the hardware acceleration processing. This further reduces consumption of another hardware device or hardware resource of the server caused by server setting, thereby further improving resource utilization.

Optionally, the hardware acceleration processing unit includes a field programmable gate array (FPGA) and has a hardware acceleration processing function.

Optionally, the hardware acceleration device further includes a shared memory, storage space of the shared memory is the data storage space corresponding to the data buffer address of the hardware acceleration processing unit, and the hardware acceleration processing unit and the network adapter share the shared memory. Correspondingly, the network adapter sending the data on which hardware acceleration processing is to be performed to data storage space corresponding to a data buffer address of the hardware acceleration processing unit includes that the network adapter writes the data on which hardware acceleration processing is to be performed into the shared memory.

Optionally, the hardware acceleration processing unit sends, according to a request of another computer device, the data buffer address of the hardware acceleration processing unit to the requesting computer device, or the hardware acceleration processing unit sends the data buffer address of the hardware acceleration processing unit to a management unit. The management unit stores address information of the hardware acceleration processing unit, and the address information in the management unit can be obtained and used by the other computer device. The data buffer address of the hardware acceleration processing unit can be obtained by the other computer device, and the other computer device can obtain the data buffer address of the hardware acceleration processing unit to request for hardware acceleration processing. Therefore, the hardware acceleration device can be shared by the other computer device.

Optionally, the hardware acceleration processing unit further includes control register information and/or status register information. Because the control register information and/or status register information can be obtained by another computer device, the other computer device can control the hardware acceleration device according to the control register information and/or obtain a status of the hardware acceleration device according to the status register information when requesting the hardware acceleration device to perform hardware acceleration processing.

Optionally, the network adapter can send the data obtained after the hardware acceleration processing according to a next-hop destination address of the data obtained after the hardware acceleration processing. By specifying a next-hop destination, the data obtained after the hardware acceleration processing may be directly returned to a requesting computer device, or may be sent to another computer device, thereby implementing flexible data processing.

According to a third aspect of the embodiments of the present disclosure, a computer device is provided. The computer device includes computer components such as a CPU and a network adapter. The computer device may further include another computer component such as a memory, a hard disk, or a power supply. The CPU obtains a data mapping address of a hardware acceleration unit of another computer device using the network adapter, sends, according to the obtained data mapping address of the hardware acceleration unit, data on which hardware acceleration processing is to be performed and the data mapping address of the hardware acceleration unit to the other computer device, and receives data that is returned by the other computer device and that is obtained after the hardware acceleration processing is performed on the data on which hardware acceleration processing is to be performed. The data mapping address is an address that is in addressing space of a CPU of the other computer device and that is obtained by MMIO processing on a data buffer address of the hardware acceleration unit.

In the foregoing computer device, hardware acceleration processing is requested using a data mapping address, and the data mapping address is an address that is in addressing space of a CPU and that is obtained by performing MMIO processing on a data buffer address of a hardware acceleration unit. Therefore, another computer device can directly send data on which hardware acceleration processing is to be performed to data storage space corresponding to the data buffer address that is of the hardware acceleration unit and that has a mapping relationship with an address in the addressing space of the CPU. In this way, a CPU and a memory of the other computer device do not need to participate in forwarding of the data on which hardware acceleration processing is to be performed. Resource consumption is reduced when the CPU of the other computer device receives and forwards the data on which hardware acceleration processing is to be performed, and storage space of the memory of the other computer device is saved.

Optionally, the CPU can send the data on which hardware acceleration processing is to be performed and the data mapping address of the hardware acceleration unit to the other computer device using the network adapter in an RDMA manner.

Optionally, the network adapter sends received data obtained after the hardware acceleration processing to the memory of the computer device. An application program that is in the computer device and that requests for hardware acceleration processing may obtain the data obtained after the hardware acceleration unit performs the hardware acceleration processing from the memory using the CPU.

Optionally, the network adapter may send the data obtained after the hardware acceleration unit performs the acceleration processing to the memory in a DMA manner.

Optionally, the CPU may send a startup acceleration processing instruction to the hardware acceleration unit, to instruct the hardware acceleration unit to perform hardware acceleration processing on the data on which hardware acceleration processing is to be performed.

Optionally, the CPU is further configured to obtain a control register address of the hardware acceleration unit, and implement control over the hardware acceleration unit according to the obtained control register address of the hardware acceleration unit.

Optionally, the CPU may control a hardware acceleration resource of the hardware acceleration unit in a manner of obtaining a queue of the hardware acceleration unit.

A hardware resource division manner is implemented as follows. A resource of the hardware acceleration unit is divided into multiple queues and different queues separately processing different data. The resource of the hardware acceleration unit is divided into multiple queues, and different queues separately process different data. This division manner may be performed in a software manner, or may be performed in a hardware logic manner. In the software division manner, management software running in the hardware acceleration unit provides a unified scheduling interface, and for all requesting parties requiring access to the hardware acceleration unit, the CPU of the computer device needs to call the scheduling interface of the management software to obtain a corresponding resource description, and control a corresponding queue according to the corresponding resource description. Hardware division is to divide a resource of the hardware acceleration unit with respect to hardware logic. For example, the hardware acceleration unit is divided into multiple hardware logical units, and each hardware logical unit is independent. When a hardware acceleration resource needs to be accessed, only one or more hardware logic units need to be applied for. This can avoid an allocation collision of a hardware acceleration device resource.

Optionally, the CPU may further obtain a lock address of the hardware acceleration unit, and the lock address is a lock address in a BAR of the hardware acceleration unit. Optionally, the lock address is an address obtained by performing MMIO processing on the lock address in the BAR of the hardware acceleration unit and then mapping the lock address to addressing space of a CPU of a computer device in which the hardware acceleration unit is located.

Optionally, the CPU may use a lock manner, or may use a lockless algorithm manner such as compare and swap (CAS). When the lock manner, that is, a busy waiting operation is used, if a computer device (such as a CPU) applying for a hardware acceleration resource cannot obtain a hardware acceleration resource, the computer device keeps attempting to obtain a hardware acceleration resource until an available resource is obtained. The CAS is also a lockless algorithm integrated in the RDMA. The CAS has three operands, a memory value V, an old expected value A, and a new value B needing to be changed. The memory value V is changed to B only when the expected value A is equal to the memory value V, otherwise, no operation is performed. When different CPUs or CPU threads of multiple computer devices attempt to use the CAS to update a same variable at the same time, only one CPU or thread can update a variable value while the other CPUs or threads fail. A failed thread is notified of the contention failure instead of being suspended, and can make an attempt again. Using such an operation, only one contention party (such as a CPU or a thread) can obtain a resource when contention exists in order to resolve a resource contention problem. For preemption for a resource of the hardware acceleration unit, the CPU may use the lock manner or the CAS manner to avoid an allocation collision of a resource of a hardware acceleration device.

Optionally, the CPU obtains the data mapping address of the hardware acceleration unit according to a hardware acceleration request of an application program of the computer device, or the CPU obtains the data mapping address of the hardware acceleration unit according to an instruction of an adaptation unit of the computer device, where the instruction of the adaptation unit is an instruction obtained after the adaptation unit converts a hardware acceleration request of an application program of the computer device.

In this way, in further implementation, the computer device does not need to modify an application program interface, and information such as the data mapping address of the hardware acceleration unit and a control calculator address is obtained using the adaptation unit. The adaptation unit may be presented as a hardware acceleration device or a hardware acceleration unit for the application program, such that the application program of the computer device does not perceive that hardware acceleration processing is implemented in another computer device.

According to a fourth aspect of the embodiments of the present disclosure, a system for implementing hardware acceleration processing is provided. The system for implementing hardware acceleration processing includes a first computer device and a second computer device. The first computer device includes a first CPU, and the second computer device includes a second CPU, a hardware acceleration unit, and a network adapter. The network adapter has an RDMA or a DMA function. The first CPU obtains a data mapping address of the hardware acceleration unit, where the data mapping address is an address that is in addressing space of the second CPU and that is obtained by MMIO processing on a data buffer address of the hardware acceleration unit, and sends, according to the obtained data mapping address of the hardware acceleration unit, data on which hardware acceleration processing is to be performed and the data mapping address of the hardware acceleration unit to the network adapter. The network adapter receives the data on which hardware acceleration processing is to be performed and the data mapping address of the hardware acceleration unit, and then directly sends, according to the data mapping address, the data on which hardware acceleration processing is to be performed to data storage space of the hardware acceleration unit. The data storage space of the hardware acceleration unit is data storage space corresponding to the data buffer address of the hardware acceleration unit. The hardware acceleration unit performs hardware acceleration processing on the data on which hardware acceleration processing is to be performed in the data storage space, and returns data obtained after the hardware acceleration processing to the first computer device.

In the foregoing system for implementing hardware acceleration processing, a data mapping address is an address that is in addressing space of a CPU and that is obtained by performing MMIO processing on a data buffer address of a hardware acceleration unit, and a network adapter has an RDMA or a DMA function. Therefore, based on the RDMA or the DMA function, when sending received data on which hardware acceleration processing is to be performed to the addressing space of the CPU, the network adapter can send, according to the data mapping address, the data on which hardware acceleration processing is to be performed to data storage space of the hardware acceleration unit. In this way, the network adapter does not need to send the received data on which hardware acceleration processing is to be performed to a memory corresponding to addressing space of the second CPU, and then the second CPU does not need to send the data on which hardware acceleration processing is to be performed from the memory to data storage space corresponding to the data buffer address of the hardware acceleration unit. Resource consumption is reduced when the second CPU of the second computer device receives and forwards the data on which hardware acceleration processing is to be performed, and storage space of the memory of the second computer device is saved.

Optionally, after completing hardware acceleration processing on the data on which hardware acceleration processing is to be performed, the hardware acceleration unit determines whether to send data obtained after the hardware acceleration processing to the first computer device, and when determining to send data obtained after the hardware acceleration processing to the first computer device, directly sends the data obtained after the hardware acceleration processing to the network adapter. Correspondingly, the network adapter sends the data obtained after the hardware acceleration processing to the first computer device.

Optionally, the first CPU is further configured to obtain a control register address of the hardware acceleration unit, and obtain, according to the obtained control register address of the hardware acceleration unit, a permission for controlling the hardware acceleration unit, where the control register address is an address for performing MMIO processing on the control register address of the hardware acceleration unit and for mapping the control register address to the addressing space of the second CPU.

Optionally, the first CPU obtains the data mapping address of the hardware acceleration unit of the second computer device according to a hardware acceleration request of an application program of the first computer device, or the first CPU obtains the data mapping address of the hardware acceleration unit according to an instruction of an adaptation unit of the first computer device, where the instruction of the adaptation unit is an instruction obtained after the adaptation unit converts a hardware acceleration request of an application program of the first computer device.

Optionally, the system for hardware acceleration processing may further include a management node, and the management node is configured to obtain a data mapping address of a hardware acceleration unit of the first computer device and/or the second computer device. After the management node stores a data mapping address of a hardware acceleration unit of each computer device, the management node may be used by another computer device to obtain related information in order to share a hardware acceleration resource.

Optionally, the management node may be an independent device such as a server, or may be a chip with a storage function, disposed in the first computer device or the second computer device.

Optionally, the management node may actively obtain and store the data mapping address of the hardware acceleration unit of each computer device, or may receive a data mapping address of a hardware acceleration unit sent by a computer device.

Optionally, the management node may further perform authentication according to a preset rule, and a corresponding data mapping address of a hardware acceleration unit can be obtained only for an authenticated application. In addition, a hardware acceleration resource may be allocated according to a busy/idle state of the hardware acceleration resource of each computer device, and a related hardware acceleration resource may be released according to a preset rule in order to implement more proper allocation and use of the hardware acceleration resource.

According to a fifth aspect of the embodiments of the present disclosure, a system for implementing hardware acceleration processing is provided. The system for implementing hardware acceleration processing includes a first computer device and a hardware acceleration device. The first computer device includes a first CPU, and the hardware acceleration device includes a hardware acceleration processing unit and a network adapter. The network adapter has an RDMA or a DMA function. The CPU obtains a data buffer address of the hardware acceleration processing unit, where data storage space corresponding to the data buffer address of the hardware acceleration processing unit is used to store data on which the hardware acceleration processing unit needs to perform hardware acceleration processing, and sends, according to the data buffer address of the hardware acceleration processing unit, data on which hardware acceleration processing is to be performed and the data buffer address of the hardware acceleration processing unit to the hardware acceleration device. The network adapter is configured to receive the data on which hardware acceleration processing is to be performed and the data buffer address of the hardware acceleration processing unit, and directly send, according to the data buffer address, the data on which hardware acceleration processing is to be performed to the data storage space corresponding to the data buffer address of the hardware acceleration processing unit. The hardware acceleration processing unit is configured to perform the hardware acceleration processing on the data on which hardware acceleration processing is to be performed in the data storage space, and return data obtained after the hardware acceleration processing to the network adapter. The network adapter is further configured to send the data obtained after the hardware acceleration processing to the first computer device.

In the foregoing system for implementing hardware acceleration processing, a hardware acceleration device includes a hardware acceleration processing unit and a network adapter, that is, the network adapter can directly send data on which hardware acceleration processing is to be performed to the hardware acceleration processing unit for processing. Participation of a CPU and a memory is eliminated, to implement hardware acceleration resource sharing, thereby further saving hardware resources. In addition, no other device besides the CPU and the memory is required to run in a server to implement the hardware acceleration processing. This further reduces consumption of another hardware device or hardware resource of the server caused by server setting, thereby further improving resource utilization.

Optionally, the hardware acceleration processing unit includes an FPGA and has a hardware acceleration processing function.

Optionally, the hardware acceleration device further includes a shared memory, the hardware acceleration processing unit and the network adapter share the shared memory, and storage space of the shared memory is the data storage space corresponding to the data buffer address of the hardware acceleration processing unit. Correspondingly, the network adapter sending the data on which hardware acceleration processing is to be performed to the data storage space corresponding to the data buffer address of the hardware acceleration processing unit includes the network adapter stores the data on which hardware acceleration processing is to be performed into the shared memory.

Optionally, the system for hardware acceleration processing may further include a management node, and the management node is configured to obtain the data buffer address of the hardware acceleration processing unit of the hardware acceleration device. After the management node stores a data mapping address or data buffer address of a hardware acceleration unit of each computer device, the management node may be used by another computer device to obtain related information, to share a hardware acceleration resource.

Optionally, the management node may be an independent device such as a server, or may be a chip with a storage function, disposed in the first computer device.

Optionally, the management node may actively obtain the data buffer address of the hardware acceleration processing unit, or may receive the data buffer address of the hardware acceleration processing unit of the hardware acceleration device.

Optionally, the management node may further perform authentication according to a preset rule, and a corresponding data mapping address of a hardware acceleration unit can be obtained only for an authenticated application. In addition, a hardware acceleration resource may be allocated according to a busy/idle state of the hardware acceleration resource of each computer device, and a related hardware acceleration resource may be released according to a preset rule in order to implement more proper allocation and use of the hardware acceleration resource.

According to a sixth aspect of the embodiments of the present disclosure, a method for implementing hardware acceleration processing is provided. The method includes receiving, by a network adapter of a first computer device, data on which hardware acceleration processing is to be performed and a data mapping address that are sent by a second computer device, where the data mapping address is an address that is in addressing space of a CPU of the first computer device and that is obtained by MMIO processing on a data buffer address of a hardware acceleration unit, sending, by the network adapter according to the data mapping address, the data on which hardware acceleration processing is to be performed to data storage space of the hardware acceleration unit, where the data storage space of the hardware acceleration unit is data storage space corresponding to the data buffer address of the hardware acceleration unit, and performing, by the hardware acceleration unit, hardware acceleration processing on the data on which hardware acceleration processing is to be performed in the data storage space, to obtain data that is after the hardware acceleration processing. Optionally, after completing the hardware acceleration processing on the data on which hardware acceleration processing is to be performed, the hardware acceleration unit determines whether to send the data obtained after the hardware acceleration processing to the second computer device, and when sending the data obtained after the hardware acceleration processing to the second computer device, directly sending the data obtained after the hardware acceleration processing to the network adapter. The network adapter sends the data obtained after the hardware acceleration processing to the second computer device.

Optionally, the hardware acceleration unit performs MMIO processing on a control register address of the hardware acceleration unit, to map the control register address to the addressing space of the CPU of the first computer device.

According to a seventh aspect of the embodiments of the present disclosure, a method for implementing hardware acceleration processing is provided. The method includes obtaining, by a first CPU of a first computer device, a data mapping address of a hardware acceleration unit of a second computer device, where the data mapping address is an address that is in addressing space of a CPU of the second computer device and that is obtained by MMIO processing on a data buffer address of the hardware acceleration unit, after obtaining the data mapping address of the hardware acceleration unit of the second computer device, sending, by the first CPU according to the obtained data mapping address of the hardware acceleration unit, data on which hardware acceleration processing is to be performed and the data mapping address of the hardware acceleration unit to a network adapter of the second computer device, where the network adapter of the second computer device is a network adapter that has a RDMA function or a DMA function, and obtaining, by the first CPU, data that is returned by the second computer device and that is obtained after the hardware acceleration processing is performed on the data on which hardware acceleration processing is to be performed.

Optionally, before obtaining, by a first CPU, a data mapping address of a hardware acceleration unit of a second computer device, the method further includes obtaining, by the first CPU, a control register address of the hardware acceleration unit, and implementing, by the first CPU, control over the hardware acceleration unit according to the control register address of the hardware acceleration unit.

Optionally, the method further includes obtaining, by the first CPU, the data mapping address of the hardware acceleration unit of the second computer device according to a hardware acceleration request of an application program of the first computer device, or obtaining, by the first CPU, the data mapping address of the hardware acceleration unit of the second computer device according to an instruction of an adaptation unit of the first computer device, where the instruction of the adaptation unit is an instruction obtained after the adaptation unit converts a hardware acceleration request of an application program of the first computer device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
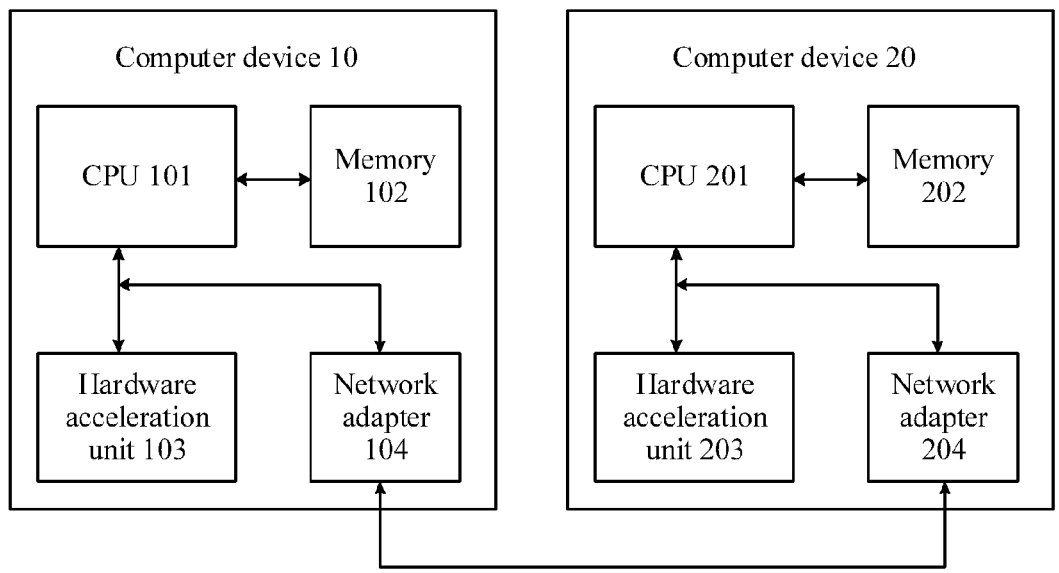
FIG. 1 is a schematic structural diagram of a system for implementing hardware acceleration.

Referring to FIG. 1, FIG. 1 is a schematic structural diagram of a system for implementing hardware acceleration. As shown in FIG. 1, a computer device 10 includes a CPU 101, a memory 102, a hardware acceleration unit 103, and a network adapter 104. A computer device 20 includes a CPU 201, a memory 202, a hardware acceleration unit 203, and a network adapter 204. The network adapter 104 is connected to the network adapter 204 over a network to implement communication between the computer device 10 and the computer device 20.

Hardware acceleration units in FIG. 1, such as the hardware acceleration unit 103 and the hardware acceleration unit 203, have a hardware acceleration function. Hardware acceleration is to use a hardware module to replace software running in a CPU to work in order to make full use of an inherent fast speed feature of hardware. Usually, the hardware acceleration has higher efficiency than a software algorithm does, can share load of some CPU services, and can implement acceleration processing on the CPU services whose load is shared. Common hardware acceleration functions include but are not limited to intelligent packet distribution, hardware compression/decompression, hardware encryption, graphics acceleration processing, and the like. In consideration of costs, usually, not all hardware acceleration functions are configured on one computer device. For example, in the computer device 10, only the hardware acceleration unit 103 that has a hardware encryption function is configured, and in the computer device 20, only the hardware acceleration unit 203 with graphics acceleration processing function is configured.

When the hardware acceleration unit 203 needs to perform acceleration processing on a service processed by an application program of the computer device 10, the application program sends data on which hardware acceleration processing needs to be performed to the hardware acceleration unit 203 using the CPU 101. The CPU 101 first sends the data on which the hardware acceleration processing needs to be performed to the network adapter 204 using the network adapter 104. The network adapter 204 sends a received acceleration request and the received data on which hardware acceleration processing is to be performed to addressing space of the CPU 201, that is, to the memory 202. After receiving a hardware acceleration processing start request sent by the CPU 101, the CPU 201 forwards the data on which hardware acceleration processing is to be performed to the hardware acceleration unit 203. After performing acceleration processing on the data on which hardware acceleration processing is to be performed, the hardware acceleration unit 203 returns data obtained after the acceleration processing to the CPU 201, that is, to the memory 202 corresponding to the addressing space of the CPU 201. The CPU 201 sends, using the network adapter 204, the data obtained after the acceleration processing to the network adapter 104 according to a destination address (storage space of the computer device 10) of the data obtained after the acceleration processing. The CPU 101 returns, to the requesting application program, the data that is received by the network adapter 104 and that is obtained after the hardware acceleration unit 203 performs the acceleration processing. The network adapter 104 sends, in an RDMA manner, the acceleration request and the data on which hardware acceleration processing is to be performed to the network adapter 204. Alternatively, the network adapter 204 may send the data obtained after the acceleration processing to the network adapter 104 in the RDMA manner.

In the foregoing acceleration processing process, when the application program of the computer device 10 needs to use a hardware acceleration resource of the computer device 20 to perform hardware acceleration processing, the CPU 201 of the computer device 20 needs to store the data received by the network adapter 204 in the memory 202 corresponding to the addressing space to send to the hardware acceleration unit 203, and needs to store the data obtained after the hardware acceleration unit 203 performs the acceleration processing in the memory 202 corresponding to the addressing space to send to the network adapter 204. In the foregoing process of copying and sending data, the CPU 201 needs to store, copy, and transfer a request and data related to the hardware acceleration, consequently causing occupation and waste of CPU 201 and memory 202 resources.

The embodiments of the present disclosure provide a method and device for implementing hardware acceleration in order to resolve a problem that CPU and memory resources are occupied and consumed when different computer devices share a hardware acceleration resource.

A hardware acceleration device usually has two implementation manners. One is a standalone hardware device independent of a CPU, and the other is a hardware acceleration function module integrated in a CPU or a network adapter. When the hardware acceleration device is independent of the CPU, the hardware acceleration device is usually a PCIe device or a peripheral component interconnect (PCI)

device. For example, when the hardware acceleration device performs data interaction using a PCIe bus, the hardware acceleration device is presented as a PCIe device, or when the hardware acceleration device performs data interaction using a PCI bus, the hardware acceleration device is presented as a PCI device. This embodiment of the present disclosure uses an example in which the hardware acceleration device is the PCIe device for description. For a hardware acceleration device in another implementation form, such as the PCI device or the hardware acceleration function module integrated in the CPU or the network adapter, reference may be made to the following implementation manner in which the hardware acceleration device is presented in a PCIe device form, and details are not repeatedly described.

A hardware acceleration device is usually accessed and used by an application program of a computer device. When the application program of the computer device requires the hardware acceleration device to perform acceleration processing in a service processing process, an instruction related to hardware acceleration is executed using the CPU. The CPU sends data on which hardware acceleration processing needs to be performed to the hardware acceleration device using an interface provided by the hardware acceleration device, and receives data that is obtained after acceleration processing and that is returned by the hardware acceleration device. The application program processes a service using the CPU. In practical application, various application programs call different hardware acceleration devices by executing different tasks, to implement the hardware acceleration processing. Therefore, for clear description of technical solutions provided in the embodiments of the present disclosure, in the embodiments of the present disclosure, a process in which the various application programs implement hardware acceleration processing using a CPU is described using an example in which the CPU initiates a hardware acceleration request and receives data obtained after the hardware acceleration processing.

Figure 2A:
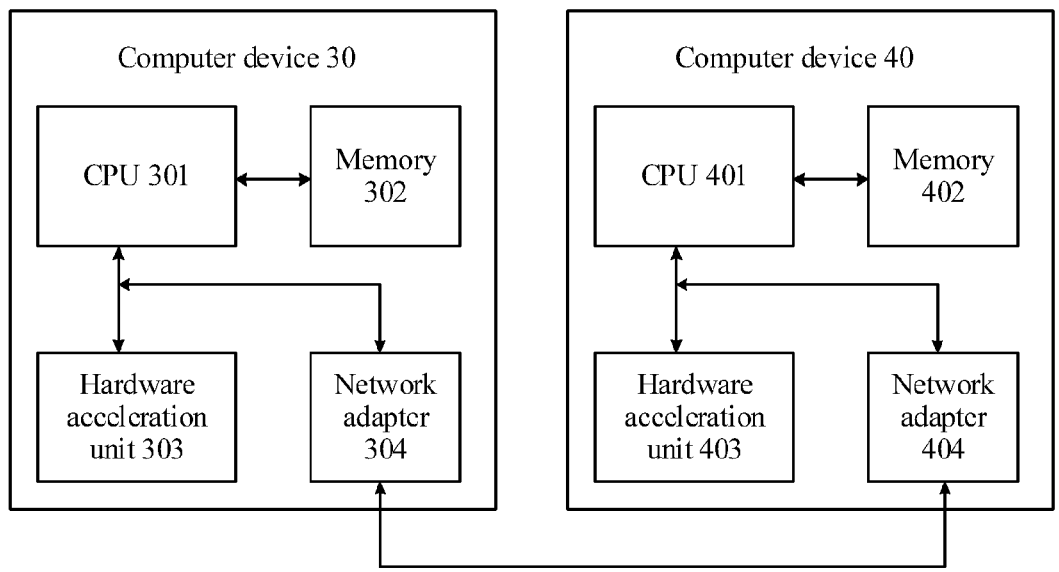
FIG. 2A is a schematic structural diagram of an application scenario of a method for hardware acceleration processing according to an embodiment of the present disclosure.

FIG. 2A is a schematic structural diagram of an application scenario of a method for hardware acceleration processing according to an embodiment of the present disclosure. As shown in FIG. 2A, a computer device 30 includes a CPU 301, a memory 302, a hardware acceleration unit 303, and a network adapter 304, and a computer device 40 includes a CPU 401, a memory 402, a hardware acceleration unit 403, and a network adapter 404. The CPU 301, the memory 302, the hardware acceleration unit 303, and a network adapter 304 are connected using an internal bus of the computer device 30. The CPU 401, the memory 402, the hardware acceleration unit 403, and the network adapter 404 are connected using an internal bus of the computer device 40. The network adapter 304 of the computer device 30 and the network adapter 404 of the computer device 40 are connected over a network in order to implement connection and communication between the computer device 30 and the computer device 40.

It should be noted that, in FIG. 2A, the hardware acceleration unit 303 and the hardware acceleration unit 403 may be implemented using the foregoing hardware acceleration device, or may be implemented using another device or module with a hardware acceleration function. In addition, FIG. 2A is only an example for illustrating a structure and composition of a computer device. In further implementation, the computer device 30 and the computer device 40 may further include another component, such as a hard disk or a graphics card. This embodiment of the present disclosure constitutes no limitation on other composition and structure further included by the computer device 30 and the computer device 40 in further implementation.

In FIG. 2A, the hardware acceleration unit 303 and the hardware acceleration unit 403 have different hardware acceleration functions. For example, the hardware acceleration unit 303 may be a hardware acceleration unit with a hardware compression/decompression function, and the hardware acceleration unit 403 may be a hardware acceleration unit with a graphics acceleration processing function. When the CPU 301 of the computer device 30 needs to use the hardware acceleration unit 403 to perform graphics acceleration processing, the CPU 301 needs to call the hardware acceleration unit 403 to perform the graphics acceleration processing. In further implementation, the hardware acceleration unit 303 and the hardware acceleration unit 403 may have a same hardware acceleration function. However, when the CPU 301 needs to call the hardware acceleration unit 403 of the computer device 40 to perform hardware acceleration processing, an implementation manner provided in this embodiment of the present disclosure may be used for implementation. This embodiment of the present disclosure constitutes no limitation on an implementation manner of a function of a hardware acceleration unit.

In FIG. 2A, the network adapter 404 is a network adapter that has an RDMA function, or may be a network adapter that has a DMA function, and the network adapter 304 may also be a network adapter that has the RDMA or the DMA function. When the computer device 30 is to send data to the computer device 40 in an RDMA manner, the CPU 301 sends the address information of the to-be-sent data to the network adapter 304, and the network adapter 304 reads the corresponding data from data storage space corresponding to the address information according to the address information of the to-be-sent data, and sends the corresponding data to the network adapter 404. When the network adapter 404 of the computer device 40 receives data in the RDMA manner, the network adapter 404 receives to-be-stored data and address information of the to-be-stored data. The network adapter 404 directly stores, according to the address information of the to-be-stored data, the received to-be-stored data in data storage space of the computer device 40 corresponding to the address information of the to-be-stored data. Usually, the address information of the to-be-stored data received by the network adapter 404 is address information in addressing space of the CPU 401. It should be noted that, the network adapter 404 may receive the to-be-stored data and the address information of the to-be-stored data at the same time, or first receive the address information of the to-be-stored data and then the to-be-stored data, or first receive the to-be-stored data and then the address information of the to-be-stored data.

Figure 3:
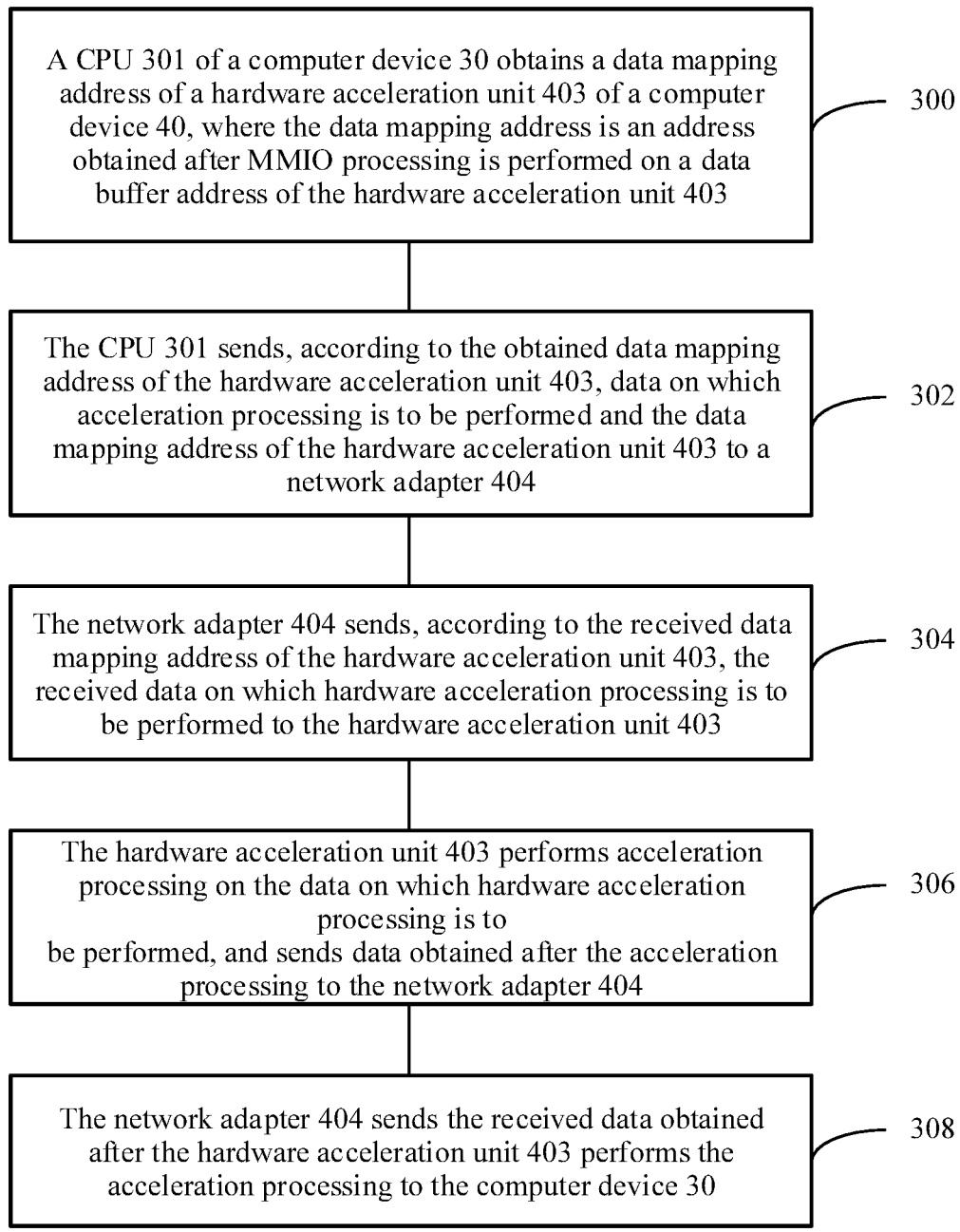
FIG. 3 is a schematic flowchart of a method for implementing hardware acceleration processing according to an embodiment of the present disclosure.

With reference to a hardware architecture shown in FIG. 2A, an embodiment of the present disclosure provides a method for implementing hardware acceleration processing. When an application program of the computer device 30 needs to use the hardware acceleration unit 403 of the computer device 40 to implement a hardware acceleration function, as shown in FIG. 3, the method for implementing hardware acceleration processing according to this embodiment of the present disclosure includes the following steps.

Step 300: The CPU 301 of the computer device 30 obtains a data mapping address of the hardware acceleration unit 403 of the computer device 40, where the data mapping address is an address obtained after MMIO processing is performed on a data buffer address of the hardware acceleration unit 403.

Data storage space corresponding to the data buffer address of the hardware acceleration unit 403 is data storage space in which the hardware acceleration unit 403 stores data on which hardware acceleration processing is to be performed. Performing the MMIO processing on the data buffer address of the hardware acceleration unit 403 is mapping the data buffer address of the hardware acceleration unit 403 to the addressing space of the CPU 401.

Step 302: The CPU 301 sends, according to the obtained data mapping address of the hardware acceleration unit 403, data on which hardware acceleration processing is to be performed and the data mapping address of the hardware acceleration unit 403 to the network adapter 404.

Optionally, in step 302, the CPU 301 may send the data on which hardware acceleration processing is to be performed and the data mapping address of the hardware acceleration unit 403 to the network adapter 404 using the network adapter 304 in the RDMA manner.

Step 304: The network adapter 404 sends, according to the received data mapping address of the hardware acceleration unit 403, the received data on which hardware acceleration processing is to be performed to the hardware acceleration unit 403.

Because the network adapter 404 is a network adapter that has the RDMA function, according to an RDMA protocol, the network adapter 404 sends received data to the addressing space of the CPU 401 after receiving the data. In this step, an address that is of the data on which hardware acceleration processing is to be performed and that is received by the network adapter 404 is the data mapping address of the hardware acceleration unit 403. The data mapping address is an address obtained by mapping the data buffer address of the hardware acceleration unit 403 to the addressing space of the CPU 401. Therefore, when sending the data on which hardware acceleration processing is to be performed to the addressing space of the CPU 401 according to the RDMA protocol, the network adapter 404 directly sends the data on which hardware acceleration processing is to be performed to data storage space corresponding to the data buffer address that is of the hardware acceleration unit 403 and that has a mapping relationship with an address in the addressing space of the CPU 401. In this way, the network adapter 404 does not need to send the data on which hardware acceleration processing is to be performed to the memory 402 corresponding to the addressing space of the CPU 401, and then the CPU 401 does not need to send the data on which hardware acceleration processing is to be performed from the memory 402 to the data storage space corresponding to the data buffer address of the hardware acceleration unit 403. Resource consumption is reduced when the CPU 401 receives and forwards the data on which hardware acceleration processing is to be performed, and storage space of the memory 402 is saved.

Step 306: The hardware acceleration unit 403 performs acceleration processing on the data on which hardware acceleration processing is to be performed, and sends data obtained after the acceleration processing to the network adapter 404.

After completing the acceleration processing on the data, the hardware acceleration unit 403 triggers to send the data obtained after the acceleration processing to the CPU 401, that is, to the memory 402 corresponding to the addressing space of the CPU 401, and the CPU 401 sends the data obtained after the acceleration processing from the memory 402 to the network adapter 404. In this embodiment of the present disclosure, when returning the data obtained after the acceleration processing, the hardware acceleration unit 403 may determine whether to send the data obtained after the acceleration processing to the computer device 30. A manner of the determining may be implemented according to a destination address (the destination address is located in the computer device 30) or a preset identifier (an identifier identifying that the data obtained after the acceleration processing comes from the computer device 30) of the data obtained after the acceleration processing. When sending the data to the computer device 30, the data obtained after the acceleration processing is directly sent to the network adapter 404. Because the data obtained after the acceleration processing is directly sent by the hardware acceleration unit 403 to the network adapter 404 instead of the memory 402 corresponding to the addressing space of the CPU 401, resource consumption of the CPU 401 and the memory 402 is further reduced.

Step 308: The network adapter 404 sends the received data obtained after the hardware acceleration unit 403 performs the acceleration processing to the computer device 30.

Further, the network adapter 404 may send the received data obtained after the hardware acceleration unit 403 performs the acceleration processing to network adapter 304 in the RDMA manner, the network adapter 304 sends the received data obtained after the acceleration processing to the memory 302, and the application program requesting hardware acceleration processing may obtain, from the memory 302 using the CPU 301, the data obtained after the hardware acceleration unit 403 performs the acceleration processing. Alternatively, the network adapter 304 may send the data obtained after the hardware acceleration unit 403 performs the acceleration processing to the memory 302 in a DMA manner.

The data mapping address is an address obtained after the MMIO processing is performed on the data buffer address of the hardware acceleration unit 403. The data buffer address of the hardware acceleration unit 403 is usually a buffer address in addressing space of a BAR of the hardware acceleration unit 403.

In this embodiment of the present disclosure, performing the MMIO processing on the data buffer address of the hardware acceleration unit 403 and mapping the data buffer address to the addressing space of the CPU 401 may be as follows.

After the computer device 40 is powered on and started, a BIOS of the computer device 40 obtains a base address and a BAR address space length of the BAR of the hardware acceleration unit 403 at a startup stage, reserves an address in the addressing space of the CPU 401 according to the base address and the BAR address space length, and reserves an address space with a length equal to the BAR address space length. When the computer device 40 loads a driver of the hardware acceleration unit 403 after entering the startup stage of an OS, the driver of the hardware acceleration unit 403 reads a base address and a BAR address space length of configuration space of the hardware acceleration unit 403, and then calls an MMIO mapping function provided by the OS to map the base address and a corresponding BAR address space to the addressing space of the CPU 401. In this way, by accessing an address in the addressing space of the CPU 401, the CPU 401 may access a buffer address of the hardware acceleration unit 403, that is, access a buffer address in the BAR address space.

MMIO is specified in a PCIe standard, that is, an address space of a PCIe device is mapped to addressing space of a CPU. When accessing the address space of the PCIe device, the CPU accesses the PCIe device by accessing the addressing space. Because the CPU accesses the PCIe device by accessing the addressing space, the CPU may use an instruction same as that for reading and writing a memory to access a data buffer address (for example, a buffer address) of the PCIe device. This can reduce program design difficulty and interface complexity.

When the hardware acceleration unit is not a PCIe device (such as an accelerator built in the CPU), the hardware acceleration unit usually has an address that can be directly accessed by the CPU. For example, a hardware acceleration device directly connected to the CPU using a DDR interface has an address space that can be accessed by the CPU. This can implement a technical effect same as that obtained after the PCIe device performs MMIO mapping.

If the hardware acceleration unit 403 does not support the MMIO mapping, the driver and hardware logic of the hardware acceleration unit 403 need to be modified to map the buffer address of the hardware acceleration unit 403 externally in an MMIO manner. Modifying the driver and the hardware logic of the hardware acceleration unit 403 to map the buffer address of the hardware acceleration unit 403 externally in the MMIO manner may be implemented according to an implementation manner in other approaches, and details are not repeatedly described in this embodiment of the present disclosure.

In this embodiment of the present disclosure, the BAR address space of the hardware acceleration unit 403 may further include a control register address. The control register address is also mapped to the addressing space of the CPU 401 when the BAR address space of the hardware acceleration unit 403 is mapped to the addressing space of the CPU 401. In this way, the computer device 30 can obtain the control register address of the hardware acceleration unit 403, thereby implementing control over the hardware acceleration unit 403.

Optionally, the BAR address space of the hardware acceleration unit 403 may further include a lock address. The lock address is also mapped to the addressing space of the CPU 401 when the BAR address space of the hardware acceleration unit 403 is mapped to the addressing space of the CPU 401. In this way, the computer device 30 can implement related exclusive control over the hardware acceleration unit 403 according to the lock address of the hardware acceleration unit 403.

As an optional implementation manner, before step 300, the technical solution provided in this embodiment of the present disclosure further includes obtaining, by the CPU 301, the control register address of the BAR address space of the hardware acceleration unit 403, where the control register address is an address obtained after the MMIO mapping, and accessing, by the CPU 301, the hardware acceleration unit 403 according to the obtained control register address of the BAR address space of the hardware acceleration unit 403 to obtain control over the hardware acceleration unit 403.

After obtaining the control over the hardware acceleration unit 403, the CPU 301 can implement exclusive control over the hardware acceleration unit 403, thereby eliminating occupation of the hardware acceleration unit 403 by another hardware acceleration requesting party. Therefore, smooth hardware acceleration processing can be ensured, and resource consumption and efficiency reduction caused by preemption for the hardware acceleration unit 403 by multiple hardware acceleration requesting parties can be avoided.

In this embodiment of the present disclosure, a manner in which the CPU 301 implements exclusive control over the hardware acceleration unit 403, thereby eliminating occupation of the hardware acceleration unit 403 by another hardware acceleration requesting party may include a hardware resource division manner or a lock operation manner.

The hardware resource division manner is implemented as follows. A resource of the hardware acceleration unit 403 is divided into multiple queues, and different queues separately process different data. That is, the resource of the hardware acceleration unit 403 is divided into multiple queues, each queue processes different data, and resources of the queues are mutually independent without interference. This division manner may be performed in a software manner, or may be performed in a hardware logic manner. In a typical software division manner, management software running in the hardware acceleration unit 403 provides a unified scheduling interface, and for all requesting parties requiring access to the hardware acceleration unit 403, the CPU 401 needs to call the scheduling interface of the management software to obtain a corresponding resource description, and control a corresponding queue according to the corresponding resource description. Hardware division is to divide a resource of the hardware acceleration unit 403 with respect to hardware logic. For example, the hardware acceleration unit 403 is divided into multiple hardware logical units, and each hardware logical unit is independent. When requiring access to a hardware acceleration resource, a hardware acceleration requesting party needs only to apply for one or more hardware logical units. In this way, the CPU 301 can apply for different queue addresses or different hardware logical units to avoid an allocation collision of a hardware acceleration device resource.

In the lock operation manner, a lock manner may be used, or a lockless algorithm manner such as CAS may be used. When the lock manner, that is, a busy waiting operation is used, if a computer device (such as a CPU 301) applying for a hardware acceleration resource cannot obtain a hardware acceleration resource, the computer device keeps attempting to obtain a hardware acceleration resource until an available resource is obtained. The CAS is also a lockless algorithm integrated in the RDMA. The CAS has three operands, a memory value V, an old expected value A, and a new value B needing to be changed. The memory value V is changed to B only when the expected value A is equal to the memory value V, otherwise, no operation is required. When different CPUs or CPU threads of multiple computer devices attempt to use the CAS to update a same variable at the same time, only one CPU or thread can update a variable value while the other CPUs or threads fail. A failed thread is notified of the contention failure instead of being suspended, and can make an attempt again. Using such operation, only one contention party (such as a CPU or a thread) can obtain a resource when contention exists in order to resolve a resource contention problem. For preemption for a resource of the hardware acceleration unit 403, the lock manner, or the CAS manner, or another resource preemption manner may be used. A resource preemption manner is not limited in this embodiment of the present disclosure, provided that the CPU 301 can obtain exclusive control over the hardware acceleration resource of the hardware acceleration unit 403.

Figure 2B:
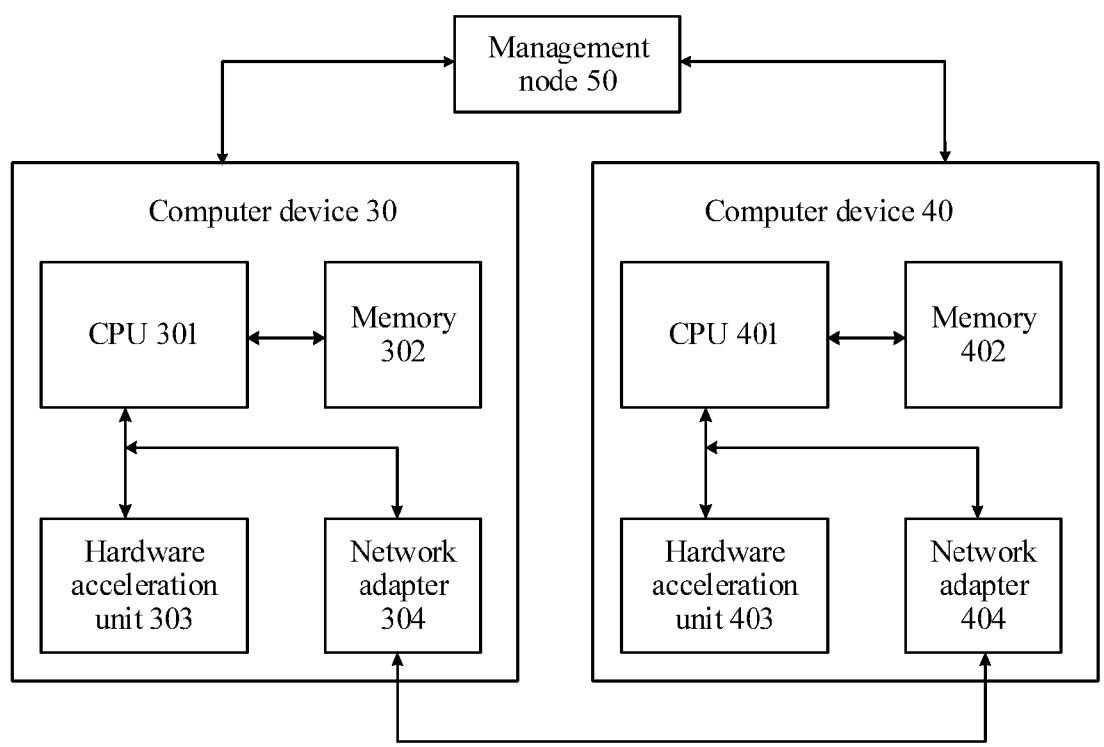
FIG. 2B is a schematic structural diagram of an application scenario of another method for hardware acceleration processing according to an embodiment of the present disclosure.

In step 300 in FIG. 3, the CPU 301 of the computer device 30 obtains the data mapping address of the hardware acceleration unit 403. The data mapping address of the hardware acceleration unit 403 may be obtained by directly sending a query request to the CPU 401, or the data mapping address of the hardware acceleration unit 403 may be obtained using a management node. The management node may be a management node 50 shown in FIG. 2B. Further, the FIG. 2B is based on the FIG. 2A. The management node 50 is separately connected to the computer device 30 and the computer device 40, obtains and stores data mapping addresses of the hardware acceleration unit 303 and the hardware acceleration unit 403 for query and use by the computer device 30 and the computer device 40. In further implementation, the management node 50 may further perform authentication according to a preset rule, and a corresponding data mapping address of a hardware acceleration unit can be obtained only for an authenticated application. In addition, a hardware acceleration resource may be allocated according to a busy/idle state of the hardware acceleration resource of each node, and a related hardware acceleration resource may be released according to a preset rule in order to implement more proper allocation and use of the hardware acceleration resource.

It should be noted that, the management node 50 in FIG. 2B exists in a form of an independent device, such as an independent server. In further implementation, the management node 50 may be integrated in the computer device 30 or the computer device 40, for example, may be used as a chip with a storage function and be disposed in the computer device 30 or the computer device 40. An implementation form of the management node 50 is not limited in this embodiment of the present disclosure.

As an optional implementation manner, in this embodiment of the present disclosure, when the hardware acceleration unit 403 maps the buffer address in the BAR address space to the addressing space of the CPU 401, some buffer addresses may be selected and mapped to the addressing space of the CPU 401, while MMIO processing may be not performed on some buffer addresses. The buffer address on which the MMIO processing is performed and that is mapped to the addressing space of the CPU 401 can be used by a CPU (for example, the CPU 301) of another computer device to apply for a corresponding hardware acceleration resource. For a buffer address on which no MMIO mapping is performed, hardware acceleration processing is left to be performed by an application program of the computer device 40. That is, a hardware acceleration resource of the hardware acceleration unit 403 can be divided into a shared resource and a private resource. The private resource is used only by the computer device 40, and the shared resource can be used by another computer device (for example, the computer device 30) except the computer device 40. For example, the hardware acceleration unit 403 supports processing of 32 queues. Resources of 16 queues may be reported to the management node 50, and resources of the remaining 16 queues may be reserved to be used by the computer device 40. In further implementation, division of the shared resource and the private resource may be adjusted dynamically to meet different actual requirements and improve flexibility of use of hardware acceleration resources.

In step 308 in FIG. 3, when sending the received data obtained after the hardware acceleration unit 403 performs the acceleration processing to the network adapter 304 in the RDMA manner, the network adapter 404 may send the processed data to the network adapter 304 by means of a SEND/WRITE operation.

If the network adapter 404 sends the data obtained after the acceleration processing to the network adapter 304 by means of the SEND operation, the computer device 30 needs to send a receive address to the network adapter 404 in advance, and the network adapter 404 sends the data obtained after the acceleration processing by means of the SEND operation according to the data receive address. The receive address is an address corresponding to data storage space in which the computer device 30 stores the data obtained after the acceleration processing. After completing receiving, the computer device 30 notifies the computer device 40 in an interrupt or event notification manner that data receiving is completed. If the network adapter 404 sends the data obtained after the acceleration processing to the network adapter 304 by means of the WRITE operation, the data obtained after the acceleration processing may be written into the network adapter 304 or be directly written into destination storage space using the network adapter 304. After the network adapter 404 completes data writing, the computer device 40 sends a write operation completion notification to the CPU 301 of the computer device 30 to instruct the CPU 301 to complete data acceleration processing.

In this embodiment of the present disclosure, in a driver initialization process of the hardware acceleration unit 403 that is used as a PCIe device, the CPU 401 reads content of a register in the configuration space of the hardware acceleration unit 403 according to the PCIe protocol, initializes the hardware acceleration unit 403 according to the read content, and provides an operation control interface. The hardware acceleration unit 403 provides the CPU 401 with an application programming interface (API), and the CPU 401 accesses the hardware acceleration unit 403 using the API to implement access to the hardware acceleration unit 403. The API may be an API with a uniform standard, for example, a switch abstraction interface (SAI) of an open compute project (OCP) in network function virtualization (NFV) or a DIRECTX interface of MICROSOFT Corporation, or may be an API interface customized by a hardware acceleration device manufacturer. An API interface is not limited in this embodiment of the present disclosure.

Similarly, in step 300 in FIG. 3, the CPU 301 obtains the data mapping address of the hardware acceleration unit 403 by executing an instruction of an application program. In this case, an interface of the application program needs to be modified, such that the application program can send an instruction, and obtain information such as the data mapping address of the hardware acceleration unit 403 using the CPU 301. In further implementation, the interface of the application program of the computer device 30 may not be modified, and information such as the data mapping address of the hardware acceleration unit 403 and a control calculator address is obtained using an adaptation unit (not shown). The adaptation unit may be presented as a real hardware acceleration device or hardware acceleration unit for an upper-layer application, but data acceleration processing is completed by interaction between the adaptation unit and the hardware acceleration unit 403 of the computer device 40. In this way, modification on interfaces of multiple applications may be avoided, and solution applicability is improved using only one adaptation unit to implement hardware acceleration processing.

As an optional implementation manner, after step 302 in FIG. 3, the method for implementing hardware acceleration processing provided in this embodiment of the present disclosure further includes the following step (not shown).

Step 303: The CPU 301 sends an acceleration processing start instruction to the hardware acceleration unit 403.

The CPU 301 may send the acceleration processing start instruction to the hardware acceleration unit 403 in the RDMA manner. Further, the CPU 301 may send the acceleration processing start instruction to the control register address of the hardware acceleration unit 403 directly in the RDMA manner to instruct the hardware acceleration unit 403 to start the hardware acceleration processing.

In this embodiment of the present disclosure, the network adapter 404 or the network adapter 304 may be a host bus adapter (HBA) with the RDMA function, including but not limited to hardware devices such as an RDMA over Converged Ethernet (ROCE) network adapter, a fiber channel (FC) over RDMA network adapter, or an Internet wide-area RDMA protocol (iWARP) network adapter.

Figure 4:
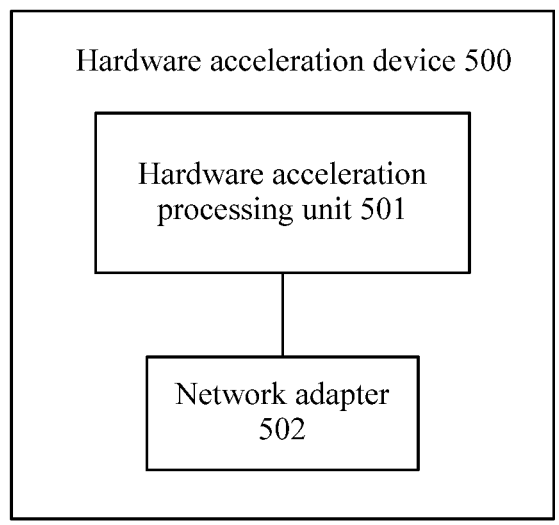
FIG. 4 is a schematic structural diagram of a hardware acceleration device according to an embodiment of the present disclosure.

In an embodiment of the present disclosure, another hardware acceleration device is further provided. As shown in FIG. 4, FIG. 4 is a schematic structural diagram of another hardware acceleration device 500 according to this embodiment of the present disclosure. The hardware acceleration device 500 includes a hardware acceleration processing unit 501 and a network adapter 502. The hardware acceleration processing unit 501 of the hardware acceleration device 500 has a hardware acceleration processing function, for example, may have functions such as intelligent packet distribution, hardware compression/decompression, hardware encryption, and graphics acceleration processing. The hardware acceleration processing unit 501 may be implemented by devices with the hardware acceleration processing function, such as an FPGA.

The hardware acceleration processing unit 501 may process a hardware acceleration request sent by another computer device, and return processed data to the other requesting computer device after hardware acceleration processing. This embodiment of the present disclosure uses an example in which the hardware acceleration device 500 receives a hardware acceleration request of a computer device 30 and performs hardware acceleration processing, to describe an implementation manner of the hardware acceleration device 500.

Figure 5A:
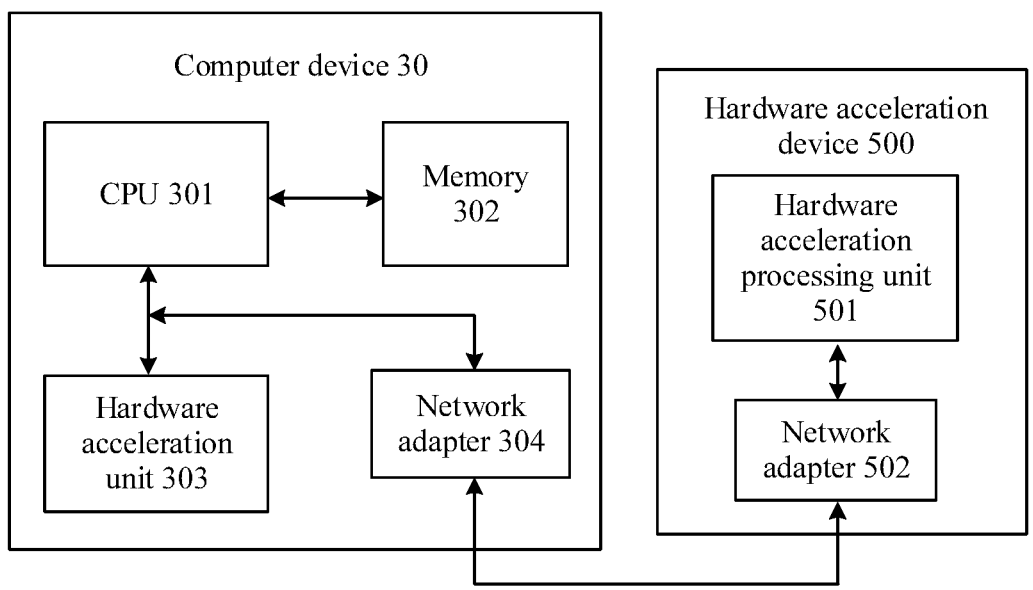
FIG. 5A is a schematic structural diagram of a first system for implementing hardware acceleration processing according to an embodiment of the present disclosure.

As shown in FIG. 5A, the hardware acceleration device 500 includes the hardware acceleration processing unit 501 and the network adapter 502, and the computer device 30 includes a CPU 301, a memory 302, a hardware acceleration unit 303, and a network adapter 304. The network adapter 304 of the computer device 30 is connected to the network adapter 502 of the hardware acceleration device 500 over a network in order to implement connection and communication between the computer device 30 and the hardware acceleration device 500.

The hardware acceleration processing unit 501 of the hardware acceleration device 500 has a data buffer address, and data storage space corresponding to the data buffer address is used to store data on which hardware acceleration processing is to be performed. In this embodiment of the present disclosure, the data buffer address of the hardware acceleration processing unit 501 can be obtained by the computer device 30. That is, the CPU 301 of the computer device 30 may obtain the data buffer address of the hardware acceleration processing unit 501. When an application program of the computer device 30 needs to perform hardware acceleration processing, the data on which hardware acceleration processing is to be performed may be sent to the hardware acceleration device 500 using the CPU 301 according to the obtained data buffer address of the hardware acceleration processing unit 501.

The network adapter 502 is a network adapter that has an RDMA or a DMA function. After receiving the data on which hardware acceleration processing is to be performed and that is sent by the computer device 30, the network adapter 502 directly sends the data on which hardware acceleration processing is to be performed to the hardware acceleration processing unit 501 according to the received data buffer address of the hardware acceleration processing unit 501. Further, the hardware acceleration processing unit 501 can share a memory with the network adapter 502, that is, the hardware acceleration device 500 further includes a shared memory. When receiving the data on which hardware acceleration processing is to be performed, the network adapter 502 can directly store the received data on which hardware acceleration processing is to be performed into the shared memory. The hardware acceleration processing unit 501 directly obtains the data on which hardware acceleration processing is to be performed from the shared memory to perform hardware acceleration processing. Optionally, an address of the shared memory is the data buffer address of the hardware acceleration processing unit 501.

In this embodiment of the present disclosure, the hardware acceleration processing unit 501 further includes control register information and/or status register information. The CPU 301 of the computer device 30 can obtain the control register information and/or status register information of the hardware acceleration processing unit 501. The control register information may include a control register address. The CPU 301 can implement control over the hardware acceleration processing unit 501 using the control register address of the hardware acceleration processing unit 501. The status register information may include a status register address. The CPU 301 can obtain a status of the hardware acceleration processing unit 501 using the status register address in order to request the hardware acceleration processing unit 501 to perform hardware acceleration processing when the hardware acceleration processing unit 501 is idle. In this way, the computer device 30 can send a control command to the hardware acceleration processing unit 501 directly using the network adapter 502 to control the hardware acceleration processing unit 501 to perform hardware acceleration processing on data.

After performing acceleration processing on the received data on which hardware acceleration processing is to be performed, the hardware acceleration processing unit 501 sends data obtained after the acceleration processing to the network adapter 502, and the network adapter 502 sends the data according to a next-hop destination address of the data obtained after the acceleration processing. By specifying a next-hop destination, the processed data may be directly returned to an original sending node (the computer device 30), or the processed data may be sent to another network node according to a service requirement. It should be understood that, the network adapter 502 can send the data obtained after the acceleration processing in an RDMA manner.

The hardware acceleration device 500 in FIG. 4 only includes the hardware acceleration processing unit 501 and the network adapter 502. Participation of the CPU 401 and the memory 402 in FIG. 2A is eliminated, thereby further saving hardware resources. In addition, devices such as the CPU 401 and the memory 402 are not required to run in a server to implement the hardware acceleration processing. This further reduces consumption of another hardware device or hardware resource of the server caused by server setting, thereby further improving resource utilization.

Figure 5B:
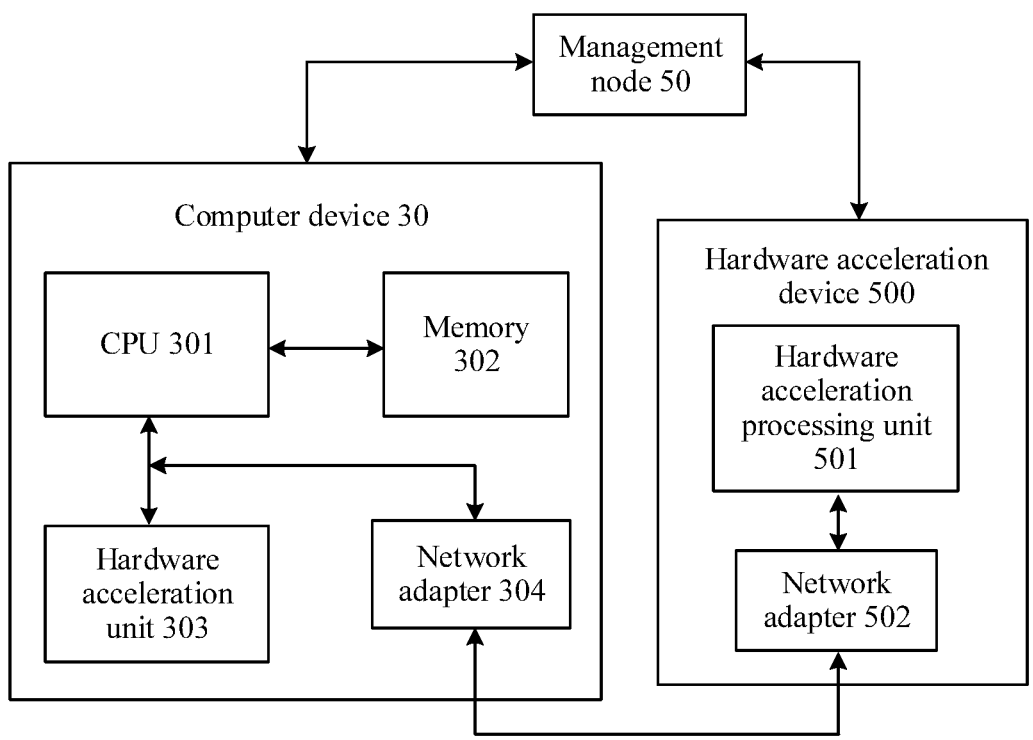
FIG. 5B is a schematic structural diagram of a second system for implementing hardware acceleration processing according to an embodiment of the present disclosure.

The data buffer address of the hardware acceleration processing unit 501 can be obtained by the computer device 30. In further implementation, the computer device 30 may send a request for obtaining the data buffer address to the hardware acceleration processing unit 501, and the hardware acceleration processing unit 501 may send the data buffer address of the hardware acceleration processing unit 501 to the computer device 30 in a request response, or the computer device 30 may obtain the data buffer address of the hardware acceleration processing unit 501 from a management unit. For example, as shown in FIG. 5B, which is based on FIG. 5A, the computer device 30 and the hardware acceleration device 500 are separately connected to a management node 50. The management node 50 stores the data buffer address of the hardware acceleration processing unit 501 of the hardware acceleration device 500, and may further store the data mapping address of the hardware acceleration unit 303 of the computer device 30. The management node 50 may actively obtain and store the data mapping address of the hardware acceleration unit 303 and the data buffer address of the hardware acceleration device 500, or may receive the data mapping address the hardware acceleration unit 303 sent by the computer device 30 or the data buffer address of the hardware acceleration processing unit 501 sent by the hardware acceleration device 500. In further implementation, the management node 50 may further perform authentication according to a preset rule, and a corresponding data mapping address of a hardware acceleration unit can be obtained only for an authenticated application. In addition, a hardware acceleration resource may be allocated according to a busy/idle state of the hardware acceleration resource of each node, and a related hardware acceleration resource may be released according to a preset rule in order to implement more proper allocation and use of the hardware acceleration resource.

Figure 5C:
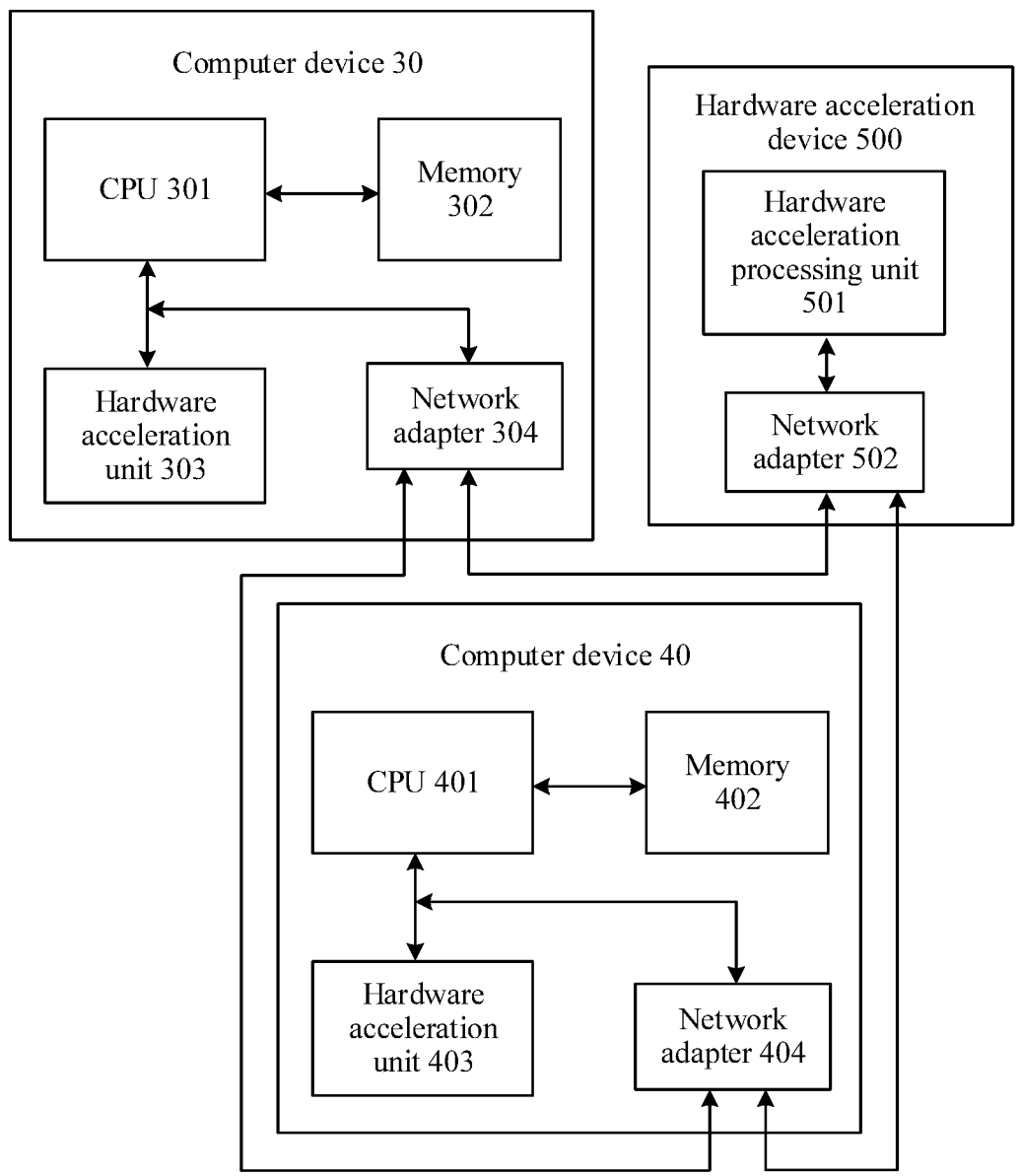
FIG. 5C is a schematic structural diagram of a third system for implementing hardware acceleration processing according to an embodiment of the present disclosure.

In another implementation manner provided in this embodiment of the present disclosure, the computer device 30, the computer device 40, and the hardware acceleration device 500 are interconnected over a network, to share a hardware acceleration resource. As shown in FIG. 5C, the computer device 30 is separately connected to the computer device 40 and the hardware acceleration device 500 using the network adapter 304. The computer device 30 may use the hardware acceleration unit 403 of the computer device 40 to perform hardware acceleration processing, or may use the hardware acceleration processing unit 501 of the hardware acceleration device 500 to perform hardware acceleration processing. When the computer device 30 uses the hardware acceleration unit 403 of the computer device 40 to perform hardware acceleration processing, reference may be made to implementation manners of the embodiments shown in FIG. 2A, FIG. 2B, and FIG. 3. When the computer device 30 uses the hardware acceleration processing unit 501 of the hardware acceleration device 500 to perform hardware acceleration processing, reference may be made to an implementation manner of the embodiment shown in FIG. 5A.

Figure 5D:
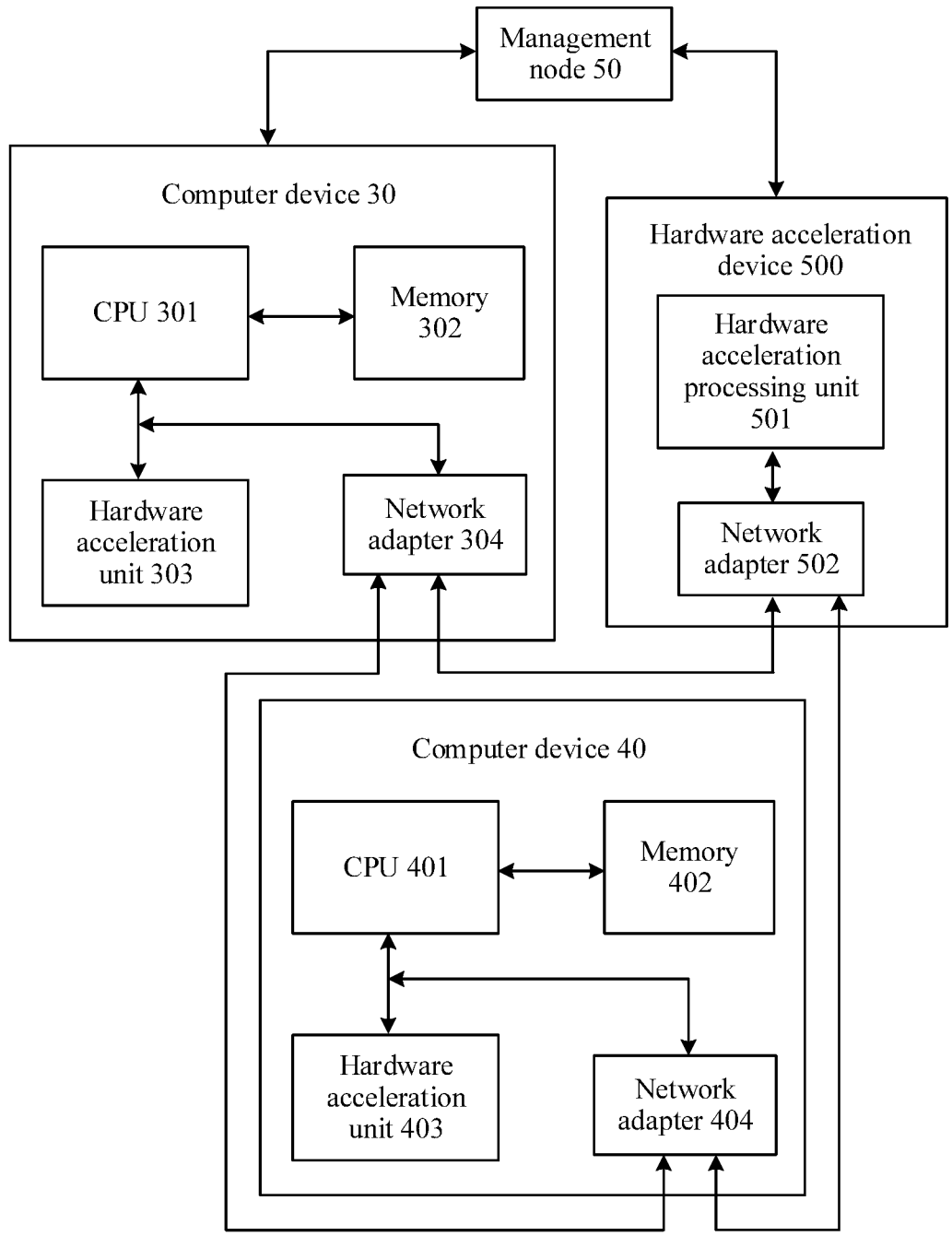
FIG. 5D is a schematic structural diagram of a fourth system for implementing hardware acceleration processing according to an embodiment of the present disclosure.

It should be understood that, in an implementation manner shown in FIG. 5C, the management node 50 is further included. As shown in FIG. 5D, similar to the management unit 50 in FIG. 2B and FIG. 5B, the management node 50 collects and manages the data mapping addresses of the hardware acceleration unit 303 or the hardware acceleration unit 403 and the data buffer address of the hardware acceleration processing unit 501.

An embodiment of the present disclosure further provides a computer device (not shown), where the computer device includes a CPU, a hardware acceleration unit, and a network adapter, and the network adapter has an RDMA or a DMA function.

The network adapter is configured to receive data on which hardware acceleration processing is to be performed and a data mapping address that are sent by another computer device, where the data mapping address is an address that is in addressing space of the CPU and that is obtained by MMIO processing on a data buffer address of the hardware acceleration unit.

The network adapter is further configured to send, according to the data mapping address, the data on which hardware acceleration processing is to be performed to data storage space of the hardware acceleration unit, where the data storage space of the hardware acceleration unit is data storage space corresponding to the data buffer address of the hardware acceleration unit.

The hardware acceleration unit is configured to perform hardware acceleration processing on the data on which hardware acceleration processing is to be performed in the data storage space, to obtain data that is after the hardware acceleration processing.

The computer device may be implemented with reference to the implementation manners of the computer device 40 in FIG. 2A, FIG. 2B, FIG. 3, FIG. 5C, and FIG. 5D, and details are not repeatedly described.

An embodiment of the present disclosure further provides a hardware acceleration device (not shown), where the hardware acceleration device includes a hardware acceleration processing unit and a network adapter, and the network adapter has an RDMA or a DMA function.

The network adapter is configured to receive data on which hardware acceleration processing is to be performed, and send the data on which hardware acceleration processing is to be performed to data storage space corresponding to a data buffer address of the hardware acceleration processing unit, where the data storage space corresponding to the data buffer address is used to store data on which the hardware acceleration processing unit needs to perform hardware acceleration processing.

The hardware acceleration processing unit is configured to perform the hardware acceleration processing on the data on which hardware acceleration processing is to be performed in the data storage space, and return data obtained after the hardware acceleration processing to the network adapter.

The hardware acceleration device may be implemented with reference to the implementation manners of the hardware acceleration device 500 in FIG. 4, FIG. 5A, FIG. 5B, FIG. 5C, and FIG. 5D, and details are not repeatedly described.

An embodiment of the present disclosure further provides a computer device (not shown), and the computer device includes a CPU and a network adapter.

The CPU is configured to obtain a data mapping address of a hardware acceleration unit of another computer device using the network adapter, where the data mapping address is an address that is in addressing space of a CPU of the other computer device and that is obtained by MMIO processing on a data buffer address of the hardware acceleration unit.

The CPU is further configured to send, according to the obtained data mapping address of the hardware acceleration unit, data on which hardware acceleration processing is to be performed and the data mapping address of the hardware acceleration unit to the other computer device, and receive data that is returned by the other computer device and that is obtained after the hardware acceleration processing is performed on the data on which hardware acceleration processing is to be performed.

The computer device may be implemented with reference to the implementation manners of the computer device 30 in FIG. 2A, FIG. 2B, FIG. 3, FIG. 5A, FIG. 5B, FIG. 5C, and FIG. 5D in the foregoing embodiments, and details are not repeatedly described.

An embodiment of the present disclosure further provides a system (not shown) for implementing hardware acceleration processing, including a first computer device and a second computer device, where the first computer device includes a first CPU, the second computer device includes a second CPU, a hardware acceleration unit, and a network adapter, and the network adapter has an RDMA or a DMA function.

The first CPU is configured to obtain a data mapping address of the hardware acceleration unit, where the data mapping address is an address that is in addressing space of the second CPU and that is obtained by MMIO processing on a data buffer address of the hardware acceleration unit, and send, according to the obtained data mapping address of the hardware acceleration unit, data on which hardware acceleration processing is to be performed and the data mapping address of the hardware acceleration unit to the network adapter.

The network adapter is configured to receive the data on which hardware acceleration processing is to be performed and the data mapping address of the hardware acceleration unit, and send, according to the data mapping address, the data on which hardware acceleration processing is to be performed to data storage space of the hardware acceleration unit, where the data storage space of the hardware acceleration unit is data storage space corresponding to the data buffer address of the hardware acceleration unit.

The hardware acceleration unit is configured to perform hardware acceleration processing on the data on which hardware acceleration processing is to be performed in the data storage space, and return data obtained after the hardware acceleration processing to the first computer device.

The system for implementing hardware acceleration processing may be implemented with reference to the implementation manners of FIG. 2A, FIG. 2B, FIG. 3, FIG. 5C, and FIG. 5D in the foregoing embodiments, and details are not repeatedly described.

An embodiment of the present disclosure further provides a system (not shown) for implementing hardware acceleration processing, including a first computer device and a hardware acceleration device, where the first computer device includes a CPU, the hardware acceleration device includes a hardware acceleration processing unit and a network adapter, and the network adapter has an RDMA or a DMA function.

The CPU is configured to obtain a data buffer address of the hardware acceleration processing unit, where data storage space corresponding to the data buffer address of the hardware acceleration processing unit is used to store data on which the hardware acceleration processing unit needs to perform hardware acceleration processing, and send, according to the obtained data buffer address of the hardware acceleration processing unit, the data on which hardware acceleration processing is to be performed and the data buffer address of the hardware acceleration processing unit to the hardware acceleration device.

The network adapter is configured to receive the data on which hardware acceleration processing is to be performed and the data buffer address of the hardware acceleration processing unit, and directly send, according to the data buffer address, the data on which hardware acceleration processing is to be performed to the data storage space corresponding to the data buffer address of the hardware acceleration processing unit.

The hardware acceleration processing unit is configured to perform hardware acceleration processing on the data on which hardware acceleration processing is to be performed in the data storage space, and return data obtained after the hardware acceleration processing to the network adapter.

The network adapter is further configured to send the data obtained after the hardware acceleration processing to the first computer device.

The system for implementing hardware acceleration processing may be implemented with reference to the implementation manners of FIG. 5A, FIG. 5B, FIG. 5C, and FIG. 5D in the foregoing embodiments, and details are not repeatedly described.

An embodiment of the present disclosure further provides a method for implementing hardware acceleration processing, and the method includes receiving, by a network adapter of a first computer device, data on which hardware acceleration processing is to be performed and a data mapping address that are sent by a second computer device, where the data mapping address is an address that is in addressing space of a CPU of the first computer device and that is obtained by MMIO processing on a data buffer address of the hardware acceleration unit, sending, by the network adapter according to the data mapping address, the data on which hardware acceleration processing is to be performed to data storage space of the hardware acceleration unit, where the data storage space of the hardware acceleration unit is data storage space corresponding to the data buffer address of the hardware acceleration unit, and performing, by the hardware acceleration unit, hardware acceleration processing on the data on which hardware acceleration processing is to be performed in the data storage space, to obtain data that is after the hardware acceleration processing.

An implementation manner of the first computer device in the method may be implemented with reference to the implementation manners of the computer device 40 in FIG. 2A, FIG. 2B, FIG. 3, FIG. 5C, and FIG. 5D in the foregoing embodiments, and details are not repeatedly described.

An embodiment of the present disclosure further provides a method for implementing hardware acceleration processing, and the method includes obtaining, by a first CPU of a first computer device, a data mapping address of a hardware acceleration unit of a second computer device, where the data mapping address is an address that is in addressing space of a CPU of the second computer device and that is obtained by MMIO processing on a data buffer address of the hardware acceleration unit, sending, by the first CPU according to the obtained data mapping address of the hardware acceleration unit, data on which hardware acceleration processing is to be performed and the data mapping address of the hardware acceleration unit to a network adapter of the second computer device, where the network adapter of the second computer device is a network adapter that has a RDMA function or a DMA function, and obtaining, by the first CPU, data that is returned by the second computer device and that is obtained after the hardware acceleration processing is performed on the data on which hardware acceleration processing is to be performed.

An implementation manner of the first computer device in the method may be implemented with reference to the implementation manners of FIG. 2A, FIG. 2B, FIG. 3, FIG. 5C, and FIG. 5D in the foregoing embodiments, and details are not repeatedly described.

In a conventional distributed system, a group of independent computers are usually used and presented as a unified whole to a user, and are presented as a system externally. Common physical and logical resources are used in the system, and such resources are abstracted and dynamically allocated to the user for use. Information between distributed physical resources is exchanged over a network. For the user, the conventional distributed system has only one model, and the model is implemented usually using a layer of software middleware in a bottom OS. In the method and device for implementing hardware acceleration processing provided in the embodiments of the present disclosure, a minimum unit of a distributed application is changed to a hardware acceleration resource. In this way, no modification needs to be made to an original application mode and system, and a hardware resource is better used.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has usually described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer device, comprising:
   a central processing unit (CPU);
   a hardware acceleration processor coupled to the CPU, wherein the hardware acceleration processor comprises hardware acceleration resources that are divided into shared resources and private resources, wherein the shared resources are allocated for use by other computer devices, and wherein the private resources are allocated for use by the computer device; and
   a network adapter coupled to the CPU and the hardware acceleration processor, wherein the network adapter has a remote direct memory access (RDMA) or direct memory access (DMA) function, and wherein the network adapter is configured to:
   receive data on which hardware acceleration processing is to be performed and a data mapping address that are from another computer device, wherein the data mapping address is an address in addressing space of the CPU obtained by performing memory mapping input/output (MMIO) processing on a data buffer address of the hardware acceleration processor; and
   send, according to the data mapping address, the data on which the hardware acceleration processing is to be performed to data storage space of the hardware acceleration processor, wherein the data storage space of the hardware acceleration processor is data storage space corresponding to the data buffer address of the hardware acceleration processor, and
   wherein the hardware acceleration processor is configured to:
   perform the hardware acceleration processing on the data on which the hardware acceleration processing is to be performed in the data storage space to obtain data after the hardware acceleration processing; and
   dynamically adjust division of the shared resources and the private resources based upon demand requirements of the hardware acceleration resources.

2. The computer device of claim 1, wherein the hardware acceleration processor is further configured to directly send the data obtained after the hardware acceleration processing to the network adapter when sending the data obtained after the hardware acceleration processing to the other computer device, and wherein the network adapter is further configured to send the data obtained after the hardware acceleration processing to the other computer device.

3. The computer device of claim 1, wherein the hardware acceleration processor is further configured to perform the MMIO processing on a control register address of the hardware acceleration processor to map the control register address to the addressing space of the CPU.

4. A hardware acceleration device, comprising:
a hardware acceleration processor, wherein the hardware acceleration processor comprises hardware acceleration resources that are divided into shared resources and private resources, wherein the shared resources are allocated for use by other computer devices, and wherein the private resources are allocated for use by the hardware acceleration device; and
a network adapter coupled to the hardware acceleration processor, wherein the network adapter has a remote direct memory access (RDMA) or direct memory access (DMA) function, and wherein the network adapter is configured to:
receive data on which hardware acceleration processing is to be performed; and
send the data on which the hardware acceleration processing is to be performed to data storage space corresponding to a data buffer address of the hardware acceleration processor,
wherein the data storage space corresponding to the data buffer address stores the data on which the hardware acceleration processor needs to perform the hardware acceleration processing, and
wherein the hardware acceleration processor is configured to:
perform the hardware acceleration processing on the data on which the hardware acceleration processing is to be performed in the data storage space;
return data obtained after the hardware acceleration processing to the network adapter; and
dynamically adjust division of the shared resources and the private resources based upon demand requirements of the hardware acceleration resources.

5. The hardware acceleration device of claim 4, wherein the hardware acceleration processor comprises a field programmable gate array (FPGA) having a hardware acceleration processing function.

6. The hardware acceleration device of claim 4, wherein the hardware acceleration device further comprises a shared memory, wherein storage space of the shared memory is the data storage space corresponding to the data buffer address of the hardware acceleration processor, wherein the hardware acceleration processor and the network adapter are configured to share the shared memory, and wherein when sending the data on which the hardware acceleration processing is to be performed to the data storage space, the network adapter is further configured to write the data on which the hardware acceleration processing is to be performed into the shared memory.

7. The hardware acceleration device of claim 4, wherein the hardware acceleration processor is further configured to send, according to a request of another computer device, the data buffer address of the hardware acceleration processor to the requesting computer device.

8. The hardware acceleration device of claim 4, wherein the hardware acceleration processor is further configured to send the data buffer address of the hardware acceleration processor to a management node, wherein the management node is configured to store address information of the hardware acceleration processor, and wherein the address information in the management node is configured to be obtained and used by another computer device.

9. A computer device, comprising:
a central processing unit (CPU); and
a network adapter coupled to the CPU,
wherein the CPU is configured to:
obtain a data mapping address of a hardware acceleration processor of another computer device using the network adapter, wherein the data mapping address is an address in addressing space of the CPU of the other computer device obtained by performing memory mapping input/output (MMIO) processing on a data buffer address of the hardware acceleration processor;
send, according to the obtained data mapping address of the hardware acceleration processor, data on which hardware acceleration processing is to be performed and the data mapping address of the hardware acceleration processor to the other computer device, wherein the hardware acceleration processor comprises hardware acceleration resources that are divided into shared resources and private resources, wherein the shared resources are allocated for use by the computer device, wherein the private resources are allocated for use by the other computer device, and wherein division of the shared resources and the private resources is dynamically adjusted based upon demand requirements of the hardware acceleration resources; and
receive data returned by the other computer device that is obtained after the hardware acceleration processing is performed on the data on which the hardware acceleration processing is to be performed.

10. The computer device of claim 9, wherein the CPU is further configured to:
obtain a control register address of the hardware acceleration processor; and
implement control over the hardware acceleration processor according to the obtained control register address of the hardware acceleration processor.

11. The computer device of claim 9, wherein the CPU is further configured to obtain the data mapping address of the hardware acceleration processor according to a hardware acceleration request of an application program of the computer device.

12. A system for implementing hardware acceleration processing, comprising:
a first computer device; and
a second computer device coupled to the first computer device,
wherein the first computer device comprises a first central processing unit (CPU),
wherein the second computer device comprises:
a second CPU;
a hardware acceleration processor coupled to the second CPU, wherein the hardware acceleration processor comprises hardware acceleration resources that are divided into shared resources and private resources, wherein the shared resources are allocated for use by the first computer device, and wherein the private resources are allocated for use by the second computer device; and
a network adapter coupled to the second CPU and the hardware acceleration processor, wherein the network adapter has a remote direct memory access (RDMA) or direct memory access (DMA) function, and wherein the first CPU is configured to:
obtain a data mapping address of the hardware acceleration processor, wherein the data mapping address is an address in addressing space of the second CPU obtained by performing memory mapping input/output (MMIO) processing on a data buffer address of the hardware acceleration processor; and send, according to the obtained data mapping address of the hardware acceleration processor, data on which hardware acceleration processing is to be performed and the data mapping address of the hardware acceleration processor to the network adapter, wherein the network adapter is configured to:

receive the data on which the hardware acceleration processing is to be performed and the data mapping address of the hardware acceleration processor; and send, according to the data mapping address, the data on which the hardware acceleration processing is to be performed to data storage space of the hardware acceleration processor, wherein the data storage space of the hardware acceleration processor is data storage space corresponding to the data buffer address of the hardware acceleration processor, and wherein the hardware acceleration processor is configured to:

perform hardware acceleration processing on the data on which the hardware acceleration processing is to be performed in the data storage space;

return data obtained after the hardware acceleration processing to the first computer device; and dynamically adjust division of the shared resources and the private resources based upon demand requirements of the hardware acceleration resources.

13. The system of claim 12, wherein the first CPU is further configured to obtain the data mapping address of the hardware acceleration processor according to an instruction of an adaptation processor of the first computer device, wherein the instruction of the adaptation processor is an instruction obtained after the adaptation processor converts a hardware acceleration request of an application program of the first computer device.

14. A system for implementing hardware acceleration processing, comprising:

a first computer device; and a hardware acceleration device coupled to the first computer device, wherein the hardware acceleration device comprises hardware acceleration resources that are divided into shared resources and private resources, wherein the shared resources are allocated for use by other computer devices, and wherein the private resources are allocated for use by the first computer device, wherein the first computer device comprises a central processing unit (CPU), wherein the hardware acceleration device comprises:

a hardware acceleration processor; and a network adapter, wherein the network adapter has a remote direct memory access (RDMA) or direct memory access (DMA) function, wherein the CPU is configured to:

obtain a data buffer address of the hardware acceleration processor, wherein data storage space corresponding to the data buffer address of the hardware acceleration processor stores data on which the hardware acceleration processor needs to perform hardware acceleration processing; and send, according to the obtained data buffer address of the hardware acceleration processor, the data on which the hardware acceleration processing is to be performed and the data buffer address of the hardware acceleration processor to the hardware acceleration device, wherein the network adapter is configured to:

receive the data on which the hardware acceleration processing is to be performed and the data buffer address of the hardware acceleration processor; and directly send, according to the data buffer address, the data on which the hardware acceleration processing is to be performed to the data storage space corresponding to the data buffer address of the hardware acceleration processor, wherein the hardware acceleration processor is configured to:

perform the hardware acceleration processing on the data on which the hardware acceleration processing is to be performed in the data storage space;

return data obtained after the hardware acceleration processing to the network adapter; and dynamically adjust division of the shared resources and the private resources based upon demand requirements of the hardware acceleration resources, and wherein the network adapter is further configured to send the data obtained after the hardware acceleration processing to the first computer device.

15. The system of claim 14, wherein the hardware acceleration device further comprises a shared memory, wherein the hardware acceleration processor and the network adapter are configured to share the shared memory, wherein storage space of the shared memory is the data storage space corresponding to the data buffer address of the hardware acceleration processor, and wherein when sending the data on which hardware acceleration processing is to be performed to the data storage space, the network adapter is further configured to store the data on which the hardware acceleration processing is to be performed into the shared memory.

16. A method for implementing hardware acceleration processing, comprising:

receiving, by a network adapter of a first computer device, data on which the hardware acceleration processing is to be performed and a data mapping address from a second computer device, wherein the data mapping address is an address in addressing space of a central processing unit (CPU) of the first computer device obtained by performing memory mapping input/output (MMIO) processing on a data buffer address of a hardware acceleration processor, wherein the hardware acceleration processor comprises hardware acceleration resources that are divided into shared resources and private resources, wherein the shared resources are allocated for use by the second computer device, and wherein the private resources are allocated for use by the first computer device;

sending, by the network adapter according to the data mapping address, the data on which the hardware acceleration processing is to be performed to data storage space of the hardware acceleration processor, wherein the data storage space of the hardware acceleration processor is data storage space corresponding to the data buffer address of the hardware acceleration processor;

performing, by the hardware acceleration processor, the hardware acceleration processing on the data on which the hardware acceleration processing is to be performed in the data storage space to obtain data after the hardware acceleration processing; and dynamically adjusting, by the hardware acceleration processor, division of the shared resources and the private resources based upon demand requirements of the hardware acceleration resources.

17. The method of claim 16, further comprising performing, by the hardware acceleration processor, the MMIO processing on a control register address of the hardware acceleration processor to map the control register address to the addressing space of the CPU of the first computer device.

18. A method for implementing hardware acceleration processing, comprising:
obtaining, by a first central processing unit (CPU) of a first computer device, a data mapping address of a hardware acceleration processor of a second computer device, wherein the data mapping address is an address in addressing space of a CPU of the second computer device obtained by performing memory mapping input/output (MMIO) processing on a data buffer address of the hardware acceleration processor, wherein the hardware acceleration processor comprises hardware acceleration resources that are divided into shared resources and private resources, wherein the shared resources are allocated for use by other computer devices, and wherein the private resources are allocated for use by the second computer device;
sending, by the first CPU according to the obtained data mapping address of the hardware acceleration processor, data on which the hardware acceleration processing is to be performed and the data mapping address of the hardware acceleration processor to a network adapter of the second computer device, wherein the network adapter of the second computer device is a network adapter that has a remote direct memory access (RDMA) function or a direct memory access (DMA) function;
obtaining, by the first CPU, data returned by the second computer device that is obtained after the hardware acceleration processing is performed on the data on which the hardware acceleration processing is to be performed; and
dynamically adjusting division of the shared resources and the private resources based upon demand requirements of the hardware acceleration resources.

19. The method of claim 18, wherein before obtaining the data mapping address of the hardware acceleration processor of the second computer device, the method further comprises:
obtaining, by the first CPU, a control register address of the hardware acceleration processor, and
implementing, by the first CPU, control over the hardware acceleration processor according to the control register address of the hardware acceleration processor.

20. The method claim 18, further comprising:
obtaining, by the first CPU, the data mapping address of the hardware acceleration processor of the second computer device according to a hardware acceleration request of an application program of the first computer device; or
obtaining, by the first CPU, the data mapping address of the hardware acceleration processor of the second computer device according to an instruction of an adaptation processor of the first computer device, wherein the instruction of the adaptation processor is an instruction obtained after the adaptation processor converts the hardware acceleration request of the application program of the first computer device.

* * * * *